United States Patent
Dor et al.

(10) Patent No.: US 12,509,251 B2
(45) Date of Patent: Dec. 30, 2025

(54) AUTONOMOUS ONLINE NAVIGATION AND PARAMETER ESTIMATION IN THE VICINITY OF SMALL CELESTIAL BODIES

(71) Applicant: Georgia Tech Research Corporation, Atlanta, GA (US)

(72) Inventors: Mehregan Dor, Atlanta, GA (US); Travis Driver, Atlanta, GA (US); Panagiotis Tsiotras, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 133 days.

(21) Appl. No.: 18/499,567

(22) Filed: Nov. 1, 2023

(65) Prior Publication Data

US 2024/0158104 A1    May 16, 2024

Related U.S. Application Data

(60) Provisional application No. 63/381,821, filed on Nov. 1, 2022.

(51) Int. Cl.
*B64G 1/24* (2006.01)
*B64G 3/00* (2006.01)
(Continued)

(52) U.S. Cl.
CPC .............. *B64G 1/247* (2023.08); *B64G 3/00* (2013.01); *G01C 21/24* (2013.01); *G06T 7/73* (2017.01);
(Continued)

(58) Field of Classification Search
USPC ........................................................ 701/531
See application file for complete search history.

(56) References Cited

U.S. PATENT DOCUMENTS

2022/0017239 A1* 1/2022 Chen ...................... G06V 20/13
2023/0286675 A1* 9/2023 Ward ...................... B64G 3/00

OTHER PUBLICATIONS

Dor, M., Skinner, K. A., Driver, T., and Tsiotras, P. (2021). Visual SLAM for 29. | Asteroid Relative Navigation. In Proceedings of the IEEE/CVF Conference on Computer Vision and Pattern Recognition Workshops (CVPRW), Virtual, Jun. 2021, pp. 2066-2075. IEEE. (Year: 2021).*

(Continued)

*Primary Examiner* — Adam D Tissot
(74) *Attorney, Agent, or Firm* — Meunier Carlin & Curfman LLC

(57) ABSTRACT

An exemplary system and method are disclosed for a standalone vision-based system for autonomous online navigation, e.g., around an unknown target small body. The exemplary system (also referred to as AstroSLAM) is predicated on the formulation of the SLAM problem as an incrementally growing factor graph. Using the GTSAM library and the iSAM2 engine, the exemplary system and method combine sensor fusion with the prior orbital motion to provide navigation and parameter estimation that improves the performance over a baseline SLAM implementation. The exemplary system and method can incorporate orbital motion constraints into the factor graph by devising a relative dynamics factor that can link the relative pose of the spacecraft to the problem of predicting trajectories stemming from the motion of the spacecraft in the vicinity of the small body.

17 Claims, 8 Drawing Sheets

(51) Int. Cl.
    *G01C 21/24* (2006.01)
    *G06T 7/73* (2017.01)
    *G06V 20/56* (2022.01)
    *G06V 20/64* (2022.01)
(52) U.S. Cl.
    CPC .............. *G06V 20/56* (2022.01); *G06V 20/64* (2022.01); *G06T 2200/04* (2013.01); *G06T 2207/10032* (2013.01); *G06T 2207/30252* (2013.01)

(56) References Cited

OTHER PUBLICATIONS

Baldini, F., Harvard, A., Chung, S., Nesnas, I., and Bhaskaran, S. (2018). 5. Autonomous Small Body Mapping and Spacecraft Navigation Via Real-Time SPC-SLAM. In 69th IAF International Astronautical Congress (IAC), Bremen, Germany, Oct. 2018. IAF. (Year: 2018).*
Anderson, S. and Barfoot, T. D. (2015). Full STEAM ahead: Exactly sparse Gaussian process regression for batch continuous-time trajectory estimation on SE(3). In 2015 IEEE/RSJ International Conference on Intelligent Robots and Systems (IROS), pp. 157-164, Hamburg, Germany.
Anderson, S., Barfoot, T. D., Tong, C. H., and S¨arkk¨a, S. (2015). Batch nonlinear continuous-time trajectory estimation as exactly sparse Gaussian process regression. Autonomous Robots, 39(3):221-238.
Andrle, M. S. and Crassidis, J. L. (2013). Geometric integration of quaternions. Journal of Guidance, Control, and Dynamics, 36(6):1762-1767.
Antreasian, P., Adam, C., Leonard, J., Lessac-Chenen, E., Levine, A., McAdams, J., McCarthy, L., Nelson, D., Page, B., Pelgrift, J., Sahr, E., Wibben, D., Williams, B., Williams, K., Berry, K., Getzandanner, K., Moreau, M., Rieger, S., Ashman, B., Highsmith, D., and Lauretta, D. (2022). OSIRIS-REx Proximity Operations and Navigation Performance at Bennu. In The 32nd AIAA/AAS Space Flight Mechanics Meeting, San Diego, CA. AIAA.
Baldini, F., Harvard, A., Chung, S., Nesnas, I., and Bhaskaran, S. (2018). Autonomous Small Body Mapping and Spacecraft Navigation Via Real-Time SPC-SLAM. In 69th IAF International Astronautical Congress (IAC), Bremen, Germany, Oct. 2018. IAF.
Barnouin, O., Daly, M., Palmer, E., Johnson, C., Gaskell, R., Al Asad, M., Bierhaus, E., Craft, K., Ernst, C., Espiritu, R., et al. (2020). Digital terrain mapping by the OSIRIS-REx mission. Planetary and Space Science, 180:104764.
Bay, H., Tuytelaars, T., and Van Gool, L. (2006). SURF: Speeded up robust features. In European Conference on Computer Vision, pp. 404-417, Graz, Austria. Springer.
Bercovici, B. and McMahon, J. W. (2019). Robust autonomous small-body shape reconstruction and relative navigation using range images. Journal of Guidance, Control, and Dynamics, 42(7):1473-1488.
Berry, K., Getzandanner, K., Moreau, M., Rieger, S., Antreasian, P., Adam, C., Wibben, D., Leonard, J., Levine, A., Geeraert, J., Lorenz, D., and Lauretta, D. S. (2022). Contact with Bennu! Flight Performance versus Prediction of OSIRIS-REx TAG Sample Collection. In The 32nd AIAA/AAS Space Flight Mechanics Meeting, San Diego, CA. AIAA.
Bhaskaran, S. and Kennedy, B. (2014). Closed loop terminal guidance navigation for a kinetic impactor spacecraft. Acta Astronautica, 103:322-332.
Bhaskaran, S., Nandi, S., Broschart, S., Wallace, M., Cangahuala, L. A., and Olson, C. (2011). Small body landings using autonomous onboard optical navigation. The Journal of the Astronautical Sciences, 58(3):409-427.
Chirikjian, G. (2011). Stochastic Models, Information Theory, and Lie Groups, vol. 2: Analytic Methods and Modern Applications, vol. 2. Springer Science & Business Media.
Cho, D.-M., Jung, D., and Tsiotras, P. (2009). A 5-DOF experimental platform for spacecraft rendezvous and docking. In AIAA Infotech@ Aerospace Conference and AIAA Unmanned . . . Unlimited Conference, p. 1869, Seattle, WA. AIAA.
Christian, J. and Lightsey, G. (2012). Onboard image-processing algorithm for a spacecraft optical navigation sensor system. Journal of Spacecraft and Rockets, 49(2):337-352.
Church, E., Bourbeau, T., Curriden, J., Deguzman, A., Jaen, F., Ma, H., Mahoney, K., Miller, C., Short, B., Waldorff, K., Walthall, O., and Lauretta, D. (2020). Flash LIDAR On-Orbit Performance at Asteroid Bennu. In 43rd Annual AAS Guidance and Control Conference, Breckenridge, CO. AIAA. AAS 20-148.
Cocaud, C. and Kubota, T. (2010). SURF-based SLAM scheme using octree occupancy grid for autonomous landing on asteroids. In Proceedings of the 10th International Symposium on Artificial Intelligence, Robotics and Automation in Space (i-SAIRAS), vol. 29, Sapporo, Japan. ESA.
Cocaud, C. and Kubota, T. (2012). Autonomous navigation near asteroids based on visual SLAM. In Proceedings of the 23rd International Symposium on Space Flight Dynamics, Pasadena, CA, Oct. 2012.
Dellaert, F. (2021). Factor graphs: Exploiting structure in robotics. Annual Review of Control, Robotics, and Autonomous Systems, 4:141-166.
Dellaert, F. and Kaess, M. (2017). Factor graphs for robot perception. Foundations and Trends in Robotics, 6(1-2):1-139.
Delpech, M., Bissonnette, V., and Rastel, L. (2015). Vision-based navigation for proximity operations around asteroid 99942 Apophis. In Proceedings of 25th International Symposium on Space Flight Dynamics, Munich, Germany.
Dong, J., Mukadam, M., Dellaert, F., and Boots, B. (2016). Motion planning as probabilistic inference using Gaussian processes and factor graphs. In Robotics: Science and Systems (RSS), vol. 12, Ann Arbor, MI.
Dor, M., Skinner, K. A., Driver, T., and Tsiotras, P. (2021). Visual SLAM for Asteroid Relative Navigation. In Proceedings of the IEEE/CVF Conference on Computer Vision and Pattern Recognition Workshops (CVPRW), Virtual, Jun. 2021, pp. 2066-2075. IEEE.
Driver, T., Dor, M., Skinner, K., and Tsiotras, P. (2020). Space Carving in Space: A Visual-SLAM Approach to 3D Shape Reconstruction of a Small Celestial Body. In AAS/AIAA Astrodynamics Specialist Conference, Virtual.
Fraser, D. C. (1967). A New Technique for the Optimal Smoothing of Data. PhD thesis, Massachusetts Institute of Technology.
Galvez-L´opez, D. and Tardos, J. D. (2012). Bags of binary words for fast place recognition in image sequences. IEEE Transactions on Robotics, 28(5):1188-1197.
Gaskell, R., Barnouin-Jha, O., Scheeres, D., Konopliv, A., Mukai, T., Abe, S., Saito, J., Ishiguro, M., Kubota, T., and Hashimoto, T. (2008). Characterizing and navigating small bodies with imaging data. Meteoritics & Planetary Science, 43(6):1049-1061.
Getzandanner, K. M., Berry, K. E., Antreasian, P. G., Leonard, J. M., Adam, C. D., Wibben, D. R., Moreau, M. C., Highsmith, D. E., and Lauretta, D. S. (2022). Small-Body Proximity Operations & TAG: Navigation Experiences & Lessons Learned from the OSIRIS-REx mission. In The 32nd AIAA/AAS Space Flight Mechanics Meeting, San Diego, CA.
Goossens, S., Rowlands, D. D., Mazarico, E., Liounis, A. J., Small, J. L., Highsmith, D. E., Swenson, J. C., Lyzhoft, J. R., Ashman, B. W., Getzandanner, K. M., et al. (2021). Mass and shape determination of (101955) Bennu using differenced data from multiple OSIRIS-REx mission phases. The Planetary Science Journal, 2(6):219.
Kaess, M., Johannsson, H., Roberts, R., Ila, V., Leonard, J., and Dellaert, F. (2012). iSAM2: Incremental smoothing and mapping using the Bayes tree. The International Journal of Robotics Research, 31(2):216-235.
Koller, D. and Friedman, N. (2009). Probabilistic Graphical Models: Principles and Techniques. MIT Press.
Konopliv, A., Asmar, S., Park, R., Bills, B., Centinello, F., Chamberlin, A., Ermakov, A., Gaskell, R., Rambaux, N., and Raymond, C. (2014). The Vesta gravity field, spin pole and rotation period,

(56) References Cited

OTHER PUBLICATIONS landmark positions, and ephemeris from the DAWN tracking and optical data. Icarus, 240:103-117.

Lauretta, D. (2021). The OSIRIS-REx Touch-and-Go Sample Acquisition Event and Implications for the Nature of the Returned Sample. In 52nd Lunar and Planetary Science Conference, Virtual.

Leonard, J., Moreau, M., Antreasian, P., Getzandanner, K., Church, E., Miller, C., Daily, M., Barnouin, O., and Lauretta, D. (2022a). Cross-Calibration of GNC and OLA LIDAR Systems Onboard OSIRIS-REx. In 44th Annual AAS Guidance and Control Conference, Breckenridge, CO.

Leonard, J. M., et al. (2020). OSIRIS-REx Shape Model Performance During the Navigation Campaign. In 43rd Annual AAS Guidance and Control Conference, Breckenridge, CO.

Leonard, J. M., Geeraert, J. L., Pelgrift, J. Y., Antreasian, P. G., Adam, C. D., Wibben, D. R., Getzandanner, K. M., Ashman, B. W., and Lauretta, D. S. (2022b). Navigation prediction performance during OSIRISREx proximity operations at (101955) Bennu. In The 32nd AIAA/AAS Space Flight Mechanics Meeting, San Diego, CA. AIAA.

Lepetit, V., Moreno-Noguer, F., and Fua, P. (2009). Epnp: An accurate O(n) solution to the pnp problem. International Journal of Computer Vision, 81(2):155.

Lowe, D. (2004). Distinctive image features from scale-invariant keypoints. International Journal of Computer Vision, 60(2):91-110.

Matsuzaki, T., Kameda, H., Tsujimichi, S., and Kosuge, K. (2000). Maneuvering target tracking using constant velocity and constant angular velocity model. In IEEE International Conference on Systems, Man and Cybernetics (SMC), vol. 5, pp. 3230-3234, Nashville, TN.

Miller, J. (2019). Measurements and calibrations. In Planetary Spacecraft Navigation, pp. 255-292. Springer International Publishing, Cham. pp. 255-292.

Miller, J. and Rourke, K. (1977). The application of differential VLBI to planetary approach orbit determination. The Deep Space Network Progress Report, 42:40.

Miller et al., J. K. (2002). Determination of shape, gravity and rotation state of asteroid 433 Eros. Icarus, 155(1):3-17.

Nakath, D., Clemens, J., and Rachuy, C. (2020). Active asteroid-SLAM. Journal of Intelligent & Robotic Systems, 99(2):303-333.

Nakath, D., Clemens, J., and Schill, K. (2018). Multi-Sensor Fusion and Active Perception for Autonomous Deep Space Navigation. In 21st International Conference on Information Fusion (FUSION), pp. 2596-2605, Cambridge, UK. IEEE.

Nathues, A., Sierks, H., Gutierrez-Marques, P., Schroeder, S., Maue, T., Buettner, I., Richards, M., Chistensen, U., and Keller, U. (2011). DAWN FC2 calibrated Vesta images v1.0. NASA Planetary Data System.

Nesnas, I. A. D., Hockman, B. J., Bandopadhyay, S., Morrell, B. J., Lubey, D. P., Villa, J., Bayard, D. S., Osmundson, A., Jarvis, B., Bersani, M., and Bhaskaran, S. (2021). Autonomous exploration of small bodies toward greater autonomy for deep space missions. Frontiers in Robotics and AI, 8:1-26.

Preusker, F., Scholten, F., Matz, K., Roatsch, T., Jaumann, R., Raymond, C., and Russell, C. (2016). DAWN FC2 Derived Vesta DTM SPG v1. 0. NASA Planetary Data System.

Prockter, L., Murchie, S., Cheng, A., Krimigis, S., Farquhar, R., Santo, A., and Trombka, J. (2002). The NEAR shoemaker mission to asteroid 433 Eros. Acta Astronautica, 51(1):491-500.

Rathinam, A. and Dempster, A. (2017). Monocular vision based simultaneous localization and mapping for close proximity navigation near an asteroid. In 68th IAF International Astronautical Congress, Adelaide, Australia. IAF.

Rublee, E., Rabaud, V., Konolige, K., and Bradski, G. (2011). ORB: an efficient alternative to SIFT and SURF. In IEEE International Conference on Computer Vision, pp. 2564-2571, Barcelona, Spain.

Starek, J. A., A, c ¹kme, se, B., Nesnas, I. A., and Pavone, M. (2016). Spacecraft Autonomy Challenges for Next-Generation Space Missions, pp. 34. Springer Berlin Heidelberg, Berlin, Heidelberg.

Villa, J., Mcmahon, J., Hockman, B., and Nesnas, I. (2022). Autonomous navigation and dense shape reconstruction using stereophotogrammetry at small celestial bodies. In 44th Annual AAS Guidance, Navigation, and Control Conference, Breckenridge, Colorado, Feb. 2022. AIAA. 23 pages.

Williams, B. (2002). Technical challenges and results for navigation of NEAR Shoemaker. Johns Hopkins APL Techincal Digest, 23(1):34-45.

Xie, M., Escontrela, A., and Dellaert, F. (2020). A Factor-Graph Approach for Optimization Problems with Dynamics Constraints. arXiv preprint arXiv:2011.06194.

Yan, X., Indelman, V., and Boots, B. (2017). Incremental sparse GP regression for continuous-time trajectory estimation and mapping. Robotics and Autonomous Systems, 87:120-132.

Yoshikawa, M., Kawaguchi, J., Fujiwara, A., and Tsuchiyama, A. (2015). HAYABUSA sample return mission. Asteroids IV, 1:397-418.

* cited by examiner

AUTONOMOUS ONLINE NAVIGATION AND PARAMETER ESTIMATION IN THE VICINITY OF SMALL CELESTIAL BODIES

CROSS-REFERENCE TO RELATED APPLICATIONS

This application claims priority to U.S. Provisional Application Ser. No. 63/381,821, filed on Nov. 1, 2022, and entitled "ASTROSLAM: AUTONOMOUS ONLINE NAVIGATION AND PARAMETER ESTIMATION IN THE VICINITY OF SMALL CELESTIAL BODIES." The contents of which are hereby incorporated by reference in their entirety.

STATEMENT OF GOVERNMENT SUPPORT

This invention was made with government support under Grant No. 80NSSC18K0251 awarded by the National Aeronautics and Space Administration. The government has certain rights in the invention.

BACKGROUND

Precise relative navigation techniques, incorporating increased levels of autonomy, will be a key enabling element of future small celestial body orbiter missions. Firstly, good navigation can inform safe and efficient path planning, control execution, and maneuvering. In near small celestial body missions, achieving fuel-efficiency during non-critical maneuvers and guaranteeing execution of safety-critical maneuvers requires precise knowledge of the relative position and orientation of the spacecraft with respect to the small celestial body. Secondly, precise navigation situates the acquired science data. Indeed, scientists and mission planners design science acquisition phases based on the expected scientific value of instrument data acquired at predetermined times, on specific orbits and with specific spacecraft orientations. Thirdly, precise navigation facilitates the detailed mapping and shape reconstruction of the target small celestial body, since good knowledge of the spacecraft relative position and orientation with respect to the target, as well as a good knowledge of the Sun light direction, are crucial in commonly used shape reconstruction solutions. Finally, good estimates of the spacecraft state enable precise characterization of the target small celestial body's spin state, mass moment values and gravitational model.

In recent years, with ever improving navigation solutions, space missions have successfully performed daring firsts in navigation around small celestial bodies. Orbiter Near-Earth Asteroid Rendezvous (NEAR) Shoemaker's controlled asteroid touchdown, Hayabusa I & II's touchdown and successful sample return, Dawn's orbiting of two celestial bodies in a single mission and the recent Origins, Spectral Interpretation, Resource Identification, Security Regolith Explorer's (OSIRIS-REx's) Touch-and-Go (TAG) operation leveraging Natural Feature Tracking (NFT) relying on high navigation solution accuracy during descent, are only few of the most notable feats accomplished thanks to autonomous navigation.

OSIRIS-REx proximity operations at the near-Earth asteroid Bennu, in particular, pushed the boundaries of what can be accomplished using primarily ground-in-the-loop navigation techniques. Like similar small celestial body missions, OSIRIS-REx's proximity to Bennu, as well as the asteroid's small size and low gravitational attraction relative to perturbing forces, drove the need for frequent and timely navigation updates in order to achieve mission objectives. These updates drove operations complexity and cadence, challenging the flight team, and heavily utilizing Deep Space Network (DSN) assets. OSIRIS-REx proximity operations navigation and TAG also relied on detailed local and global topographic maps constructed from image and LiDAR data, with ground sample distances ranging from 75 cm down to 8 mm. Building these maps required dedicated, months-long observation and data collection campaigns and a substantial amount of effort by the Altimetry Working Group on the ground, as well as multiple iterations with the navigation team. It also required downlinking tens of thousands of images and hundreds of gigabytes of LiDAR data from the spacecraft through the DSN.

It is recognized that the high-risk nature of missions in proximity of small bodies, along with a lack of autonomy in current mission procedures, severely limits the possibilities in mission design. Indeed, ground-segment operators are intimately involved in all in-situ tasks, which ultimately rely on extensive human-in-the-loop verification, as well as ground-based computations for estimation, guidance, and control. In addition, long round-trip light times and severely limited bitrate in communications render ground-in-the-loop processes extremely tedious. In tandem, the incorporation of autonomous capabilities has the potential to improve navigation performance and reduce operational complexity for future missions.

SUMMARY

An exemplary system and method are disclosed for a standalone vision-based system for autonomous online navigation, e.g., around an unknown target small body. The exemplary system (also referred to as AstroSLAM) is predicated on the formulation of the SLAM problem as an incrementally growing factor graph. Using the GTSAM library and the iSAM2 engine, the exemplary system and method combine sensor fusion with the prior orbital motion to provide navigation and parameter estimation that improves the performance over a baseline SLAM implementation. The exemplary system and method can incorporate orbital motion constraints into the factor graph by devising a relative dynamics factor that can link the relative pose of the spacecraft to the problem of predicting trajectories stemming from the motion of the spacecraft in the vicinity of the small body.

In an aspect, a non-transitory computer-readable medium is disclosed having instructions stored thereon, wherein execution of the instructions by a processor causes the processor to determine the navigation trajectory for a vehicle around a small celestial body (e.g., asteroid) by using an on-board camera of the vehicle, wherein the determination employs an inertial equations of motion of the vehicle and of the small celestial body in conjunction with solar gravitational force and the solar radiation pressure forces in a unified factor-graph data model.

In some embodiments, the instructions are configured to implement a front-end image processing system that provides the motion of the vehicle in part using tracked surface features of the image processing system.

In some embodiments, the factor-graph data model includes, at least: a center of mass and principal axis frame of the small body, wherein the principal axis frame of the small body is based on an a-priori unknown mass moment; a center of mass and body-fixed frame of the vehicle; and an inertial frame and point of the solar gravitational force and the solar radiation pressure forces associated with a barycenter of a solar system.

In some embodiments, the factor-graph data model is solved using a Bayesian estimator.

In some embodiments, the unified factor-graph data includes an encoding (e.g., RelDyn) for constraints derived from relative and dynamic kinematics per:

In another aspect, a method is disclosed of operating a spacecraft using the above-discussed computer-readable medium.

In another aspect, a system comprising a controller is disclosed configured to direct navigation of a spacecraft, the controller using the above-discussed computer-readable medium.

In some aspects, the techniques described herein relate to a computer-implemented including: receiving a plurality of images of a small celestial body by a spacecraft, wherein each image of the plurality of images is associated with a time; initializing a plurality of spacecraft states and small celestial body states by the spacecraft; based on the received plurality of images, generating a 3D map of the small celestial body including a plurality of landmarks by the spacecraft, wherein each landmark is associated with a location in the 3D map; generating a factor graph corresponding to the plurality of landmarks and the plurality of spacecraft states and small celestial body states by the spacecraft; receiving a new image by the spacecraft; based on the new image and some or all of the plurality of images, identifying one or more new landmarks in the 3D map and a changed location for at least one of the plurality of landmarks by the spacecraft; updating the factor graph based on the one or more new landmarks and the changed location by the spacecraft; and solving a navigation problem based on the factor graph by the spacecraft to generate relative orientations of the spacecraft and the small celestial body, relative positions of the spacecraft and the small celestial body, and relative velocities of the relative positions of the spacecraft and the small celestial body; performing path planning for the spacecraft by the spacecraft using some or all of the relative orientations of the spacecraft and the small celestial body, the relative positions of the spacecraft and the small celestial body, the relative velocities of the relative positions of the spacecraft and the small celestial bod, and the 3D map; and causing the spacecraft to travel based on the path planning by the spacecraft.

In some aspects, the techniques described herein relate to a computer-implemented method, further including: receiving visual odometry constraints and relative kinematic and dynamical constraints; and solving the navigation problem based on the factor graph and the received visual odometric constraints and the relative kinematic and dynamical constraints.

In some aspects, the techniques described herein relate to a computer-implemented method, wherein the dynamical constraints include the RelDyn factors.

In some aspects, the techniques described herein relate to a computer-implemented, further including receiving prior information about the small celestial object and initializing the plurality of small celestial body states based on the prior information.

In some aspects, the techniques described herein relate to a computer-implemented method, wherein the prior information includes a spin state estimate.

In some aspects, the techniques described herein relate to a computer-implemented method, further including solving the navigation problem based on the factor graph by the spacecraft to generate an estimate of a center-of-mass position of the small celestial body.

In some aspects, the techniques described herein relate to a computer-implemented method, wherein the small celestial body includes an asteroid or a comet.

In some aspects, the techniques described herein relate to a spacecraft including: at least one computing device; and a computer-readable medium with computer-executable instructions stored thereon that when executed by the at least one computing device cause the at least one computing device to: receive a plurality of images of a small celestial body, wherein each image of the plurality of images is associated with a time; initialize a plurality of spacecraft states and small celestial body states; based on the received plurality of images, generate a 3D map of the small celestial body including a plurality of landmarks, wherein each landmark is associated with a location in the 3D map; generate a factor graph corresponding to the plurality of landmarks and the plurality of spacecraft states and small celestial body states; receive a new image; based on the new image and some or all of the plurality of images, identify one or more new landmarks in the 3D map and a changed location for at least one of the plurality of landmarks; update the factor graph based on the one or more new landmarks and the changed location; and solve a navigation problem based on the factor graph to generate relative orientations of the spacecraft and the small celestial body, relative positions of the spacecraft and the small celestial body, and relative velocities of the relative positions of the spacecraft and the small celestial body; perform path planning for the spacecraft using some or all of the relative orientations of the spacecraft and the small celestial body, the relative positions of the spacecraft and the small celestial body, the relative velocities of the relative positions of the spacecraft and the small celestial bod, and the 3D map; and cause the spacecraft to travel based on the path planning.

In some aspects, the techniques described herein relate to a spacecraft, further including computer-executable instructions that when executed by the at least one computing device cause the at least one computing device to: receive visual odometry constraints and relative kinematic and dynamical constraints; and solve the navigation problem based on the factor graph and the received visual odometric constraints and the relative kinematic and dynamical constraints.

In some aspects, the techniques described herein relate to a spacecraft, wherein the dynamical constraints include the RelDyn factors.

In some aspects, the techniques described herein relate to a spacecraft, further including receiving prior information about the small celestial object and initializing the plurality of small celestial body states based on the prior information.

In some aspects, the techniques described herein relate to a spacecraft, wherein the prior information includes a spin state estimate.

In some aspects, the techniques described herein relate to a spacecraft, further including solving the navigation problem based on the factor graph by the spacecraft to generate an estimate of a center-of-mass position of the small celestial body.

In some aspects, the techniques described herein relate to a spacecraft, wherein the small celestial body includes an asteroid or a comet.

In some aspects, the techniques described herein relate to a non-transitory computer-readable medium with computer-executable instructions stored thereon that when executed by the at least one computing device cause the at least one computing device to: receive a plurality of images of a small celestial body, wherein each image of the plurality of images is associated with a time; initialize a plurality of spacecraft states of a spacecraft and small celestial body states; based on the received plurality of images, generate a 3D map of the small celestial body including a plurality of landmarks, wherein each landmark is associated with a location in the 3D map; generate a factor graph corresponding to the plurality of landmarks and the plurality of spacecraft states and small celestial body states; receive a new image; based on the new image and some or all of the plurality of images, identify one or more new landmarks in the 3D map and a changed location for at least one of the plurality of landmarks; update the factor graph based on the one or more new landmarks and the changed location; and solve a navigation problem based on the factor graph to generate relative orientations of the spacecraft and the small celestial body, relative positions of the spacecraft and the small celestial body, and relative velocities of the relative positions of the spacecraft and the small celestial body; perform path planning for the spacecraft using some or all of the relative orientations of the spacecraft and the small celestial body, the relative positions of the spacecraft and the small celestial body, the relative velocities of the relative positions of the spacecraft and the small celestial bod, and the 3D map; and cause the spacecraft to travel based on the path planning.

In some aspects, the techniques described herein relate to a computer-readable medium, further including computer-executable instructions that when executed by the at least one computing device cause the at least one computing device to: receive visual odometry constraints and relative kinematic and dynamical constraints; and solve the navigation problem based on the factor graph and the received visual odometric constraints and the relative kinematic and dynamical constraints.

In some aspects, the techniques described herein relate to a computer-readable medium, wherein the dynamical constraints include the RelDyn factors.

In some aspects, the techniques described herein relate to a computer-readable medium, further including receiving prior information about the small celestial object and initializing the plurality of small celestial body states based on the prior information.

In some aspects, the techniques described herein relate to a computer-readable medium, wherein the prior information includes a spin state estimate.

In some aspects, the techniques described herein relate to a computer-readable medium, further including solving the navigation problem based on the factor graph by the spacecraft to generate an estimate of a center-of-mass position of the small celestial body.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entireties and to the same extent as if each reference was individually incorporated by reference.

Figure 1:
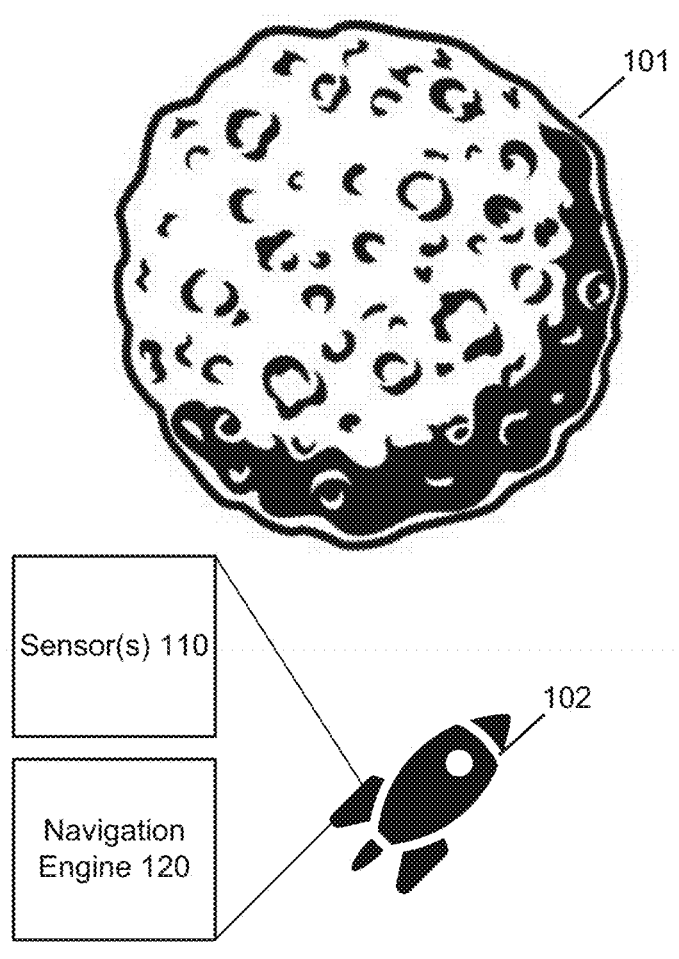
FIG. 1 is an illustration of an exemplary environment for navigating a spacecraft in the presence of a small celestial body.

FIG. 1 is an illustration of an exemplary environment 100 for navigating a spacecraft 102 in the presence of a small celestial body 101. As described above, good navigation or path planning is extremely important for a spacecraft 102 especially when the spacecraft is near a small celestial body 102. Example small celestial bodies 102 (as referred to herein as objects or asteroids) may include asteroids and comets, for example.

To facilitate the path planning, the spacecraft may include a navigation engine 120 and one or more sensors 110. The navigation engine 120 may be implemented using one or more general purpose computing devices such as the computing device 800 illustrated with respect to FIG. 8. Example sensors 110 may include one or more cameras or image generating sensors. These sensors 110 may generate images of the small celestial object 101 and may include monocular visible spectrum images. Other types of images may be supported. Each image may be associated with time or timestamp that reflects when the image was captured by the sensor 110.

To facility path planning, a front-end component of the navigation engine 120 may process images of the small celestial body 101 that are received from the sensors 110. The front-end component may process images to detect features in the images. These features are referred to herein as landmarks. These landmarks on the small celestial body 101 may then be matched between subsequent images as new images are received.

The front-end component of the navigation engine 120 may further initialize one or more states for the small celestial object 101 and the spacecraft 102. These states may include spin-state estimates, velocity estimates, and location estimates. Initially, the front-end component of the navigation engine 120 may initialize the states using prior information known about the small celestial body 101. This prior information may be measurements received from one or more ground-based systems, for example.

The front-end component of the navigation engine 120 may generate a 3D map of the landmarks detected in the images. The 3D map may be of the small celestial object 101 and may be a point cloud generated by triangulating the landmarks.

A back-end component of the navigation engine 120 may generate and maintain a factor graph. The factor graph may be initially generated by the back-end component based on the landmarks in the 3D map, the initialized states of the spacecraft 102, and orbital motion constraints. As will described further below, these orbital motion constraints can be incorporated into the factor graph by devising a relative dynamics factor ("RelDyn") that can link the relative pose of the spacecraft 102 to the problem of predicting trajectories stemming from the motion of the spacecraft 102 in the vicinity of the small celestial body 101.

The back-end component of the navigation engine 120 receives a new image of the small celestial body 101 and based on the locations of the landmarks in the received image and the factor graph, performs an optimization to generate a solution that includes estimates of past relative positions of the positions of the small celestial body 101 and the spacecraft 102, past relative orientations of the small celestial body 101 and the spacecraft 102, and past relative velocities of the small celestial body 101 and the spacecraft 102. This data, and the updated 3D map, may be used to provide path planning for the spacecraft 101 with respect to the small celestial body 101. The details of the proposed system and methods are described further below.

1. Problem Statement

In this section, are discussed the relevant theory and the problem statement pertaining to the asteroid relative navigation problem incorporating monocular SLAM, an appropriate motion prior and sensor fusion.

Firstly, the notations and conventions used throughout the disclosure are summarized in Section 1.1. Secondly, the defined notation is contextualized within the problem of a spacecraft navigating around an asteroid in Section 1.2.

1.1. Notation

Given the affine space $(\mathbb{E}^3, \mathbb{R}^3)$, the translation vector between any two points $X, Y \in \mathbb{E}^3$ is denoted $r_{YX} \triangleq (Y-X) \in \mathbb{R}^3$, read "from X to Y". Any frame $\mathcal{X}$ is a tuple $(X, \{\vec{x}_i\}_{i=1}^3)$ where the point $X \in \mathbb{E}^3$ denotes the origin of the frame and the set of unit directions $\{\vec{x}_i\}_{i=1}^3$, where $\vec{x}_i \in \mathbb{S}^2$, $i=1, \ldots, 3$, constitutes the right-handed orthonormal basis of the frame. The expression of any vector $v \in \mathbb{R}^3$ in a given frame $\mathcal{X} = (*, \{\vec{x}_i\}_{i=1}^3)$ is denoted by $v\mathcal{X} \triangleq [v \cdot \vec{x}_1 \ v \cdot \vec{x}_2 \ v \cdot \vec{x}_3]^T \in \mathbb{R}^3$. For any two frames $\mathcal{X}$ and $\mathcal{Y}$, we denote the rotation $R_{xy} \triangleq [\vec{y}_1^x \ \vec{y}_2^x \ \vec{y}_3^x]^T \in SO(3)$ such that $v\mathcal{X} = R_{xy} v^{\mathcal{Y}}$ for any $v \in \mathbb{R}^3$. This notation is consistent with the composition rule $R_{xz} = R_{xy} R_{yz}$ for any three frames $\mathcal{X}, \mathcal{Y}, \mathcal{Z}$. Given a coordinate vector $v\mathcal{X} \in \mathbb{R}^3$ expressed in frame $\mathcal{X}$, we denote the corresponding homogeneous coordinates $\overline{v\mathcal{X}} \triangleq [(v\mathcal{X})^T \ 1]^T \in \mathbb{P}^3$. For any two frames $\mathcal{X} = (X, \{\vec{x}_i\}_{i=1}^3)$ and $y=(Y, \{\vec{y}_i\}_{i=1}^3)$, we denote the homogeneous transformation $T_{xy} \in SE(3)$ by:

$$T_{xy} \triangleq \begin{bmatrix} R_{xy} & r_{YX}^x \\ 0_{1\times 3} & 1 \end{bmatrix}, \quad (1)$$

such that $\overline{r_{PX}\mathcal{X}} = T_{xy} \overline{r_{PY}^y}$ for any point $P \in \mathbb{E}$. This notation is consistent with the composition rule $T\mathcal{X} T_{xz} = T_{xy} T_{yz}$ for any three frames $\mathcal{X}, \mathcal{Y}, \mathcal{Z}$.

Given a Lie algebra $\mathfrak{g}$ of dimension n associated (at the identity) to a matrix Lie group $\mathfrak{G}$, and given a set of basis vectors $\{E_i\}_{i=1}^n$ of the matrix Lie algebra $\mathfrak{g}(n)$, we denote the hat operator $[\bullet]^\wedge: \mathbb{R}^n \to \mathfrak{g}$ which maps any n-vector $x=[x_1 \ldots x_n]^T \in \mathbb{R}^n$ to an element $[x]^\wedge \in \mathfrak{g}$, by $[x]^\wedge = \Sigma_{i=1}^n x_i E_i$. We denote its inverse vee operator $[\bullet]^\vee: \mathfrak{g} \to \mathbb{R}^n$, which extracts the coordinates $x=[x_1 \ldots x_n]^T$ from $[x]^\wedge \in \mathfrak{g}(n)$ in terms of $E_i$. We denote the exponential map exp: $\mathfrak{g} \to \mathfrak{G}$, mapping an element $[x]^\wedge \in \mathfrak{g}$ g to the element $\exp([x]^\wedge) \in \mathfrak{G}$ in the neighborhood of the identity element. Specifically, for the SO(3) group of rotations, the exponential map at the identity exp: so(3)→SO(3) which associates any tangent vector (skew-symmetric matrix) $[x]^\wedge \in$ so(3) to a 3D rotation as the matrix exponential, is given by $$\exp([x]^\wedge) = I_3 + [x]^\wedge + \frac{1}{2}([x]^\wedge)^2 + \frac{1}{6}([x]^\wedge)^3 + \ldots = \quad (2)$$

$$I_3 + \frac{\sin\|x\|}{\|x\|}[x]^\wedge + \frac{1 - \cos\|x\|}{\|x\|^2}([x]^\wedge)^2.$$

Finally, we denote the logarithm map (at the identity) by log: $\mathfrak{G} \to \mathfrak{g}$, which maps an element in the neighborhood of the identity element of group $\mathfrak{G}$ to an element in the associated Lie algebra $\mathfrak{g}$. In the case when $\mathfrak{G} = SO(3)$ and $\mathfrak{g} = so(3)$, the logarithm map log: SO(3)→so(3) is the inverse of the operation given in (2), and is a bijective mapping as long as $\|x\| < \pi$ [Chirikjian (2011)].

The following facts are useful in deriving first-order approximations for the effect of noise on stochastic differential equations, as well as for deriving partial derivatives of functions of elements of SO(3).

Fact 1 Given the hat operator $[\bullet]^\wedge: \mathbb{R}^3 \to$ so(3), for any $R \in SO(3)$, and coordinate vector $x \in \mathbb{R}^3$, $$R[x]^\wedge R^T = [Rx]^\wedge, \quad 1.$$

$$R[x]^\wedge = [Rx]^\wedge R, \quad 2.$$

$$[x]^\wedge R = R[R^T x]^\wedge. \quad 3.$$

Note that Fact 1 is a consequence of the rotational invariance of the cross product in $\mathbb{R}^3$:

Fact 2 Given the exponential map exp: so(3)→SO(3), for any $R \in SO(3)$ and any coordinate vector $x \in \mathbb{R}^3$, $$R \exp([x]^\wedge) R^T = \exp([Rx]^\wedge), \quad 1.$$

$$R \exp([x]^\wedge) = \exp([Rx]^\wedge) R, \quad 2.$$

$$\exp([x]^\wedge) R = R \exp([R^T x]^\wedge). \quad 3.$$

Note that Fact 2 is a direct consequence of Fact 1 applied to the matrix exponential expansion in (2).

Fact 3 Given the exponential map exp: so(3)→SO(3), for any vector $x \in \mathbb{R}^3$ having sufficiently small length, it follows that:

$$\exp([x]^\wedge) \approx I_3 + [x]^\wedge. \quad (3)$$

Note that Fact 3 is a consequence of dropping higher order terms in the matrix exponential expansion of equation (2).

Fact 4 Let T: $SO(3) \times \mathbb{R}^3 \to SE(3)$ be function that produces the pose corresponding to a rotation matrix and a translation vector pair, such that:

$$T(R, r) \triangleq \begin{bmatrix} R & r \\ 0 & 1 \end{bmatrix}, R \in SO(3), r \in \mathbb{R}^3.$$

Define the perturbation vectors $\delta\phi, \delta r \in \mathbb{R}^3$. We may write the perturbed pose $$T(R\exp[\delta\phi]^\wedge, r + \delta r) = \begin{bmatrix} R(\exp[\delta\phi]^\wedge) & r + \delta r \\ 0 & 1 \end{bmatrix}.$$

Multiplying the inverse of the pose $T(R, r)$ on the left, we obtain the perturbation pose:

$$\delta T = (T(R, r))^{-1} T(R\exp[\delta\phi]^\wedge, r + \delta r)$$
$$= \begin{bmatrix} R^\top & -R^\top r \\ 0 & 1 \end{bmatrix} \begin{bmatrix} R\exp([\delta\phi]^\wedge) & r + \delta r \\ 0 & 1 \end{bmatrix}.$$
$$= \begin{bmatrix} \exp([\delta\phi]^\wedge) & R^\top \delta r \\ 0 & 1 \end{bmatrix}$$

Taking the logarithm map of the SE(3) followed by the vee operator, we obtain the corresponding pose perturbation vector:

$$\delta P = \log(\delta T)^\vee = \begin{bmatrix} \delta\phi \\ R^\top \delta r \end{bmatrix},$$

thus yielding the Jacobian:

$$J_R = \begin{bmatrix} I_3 \\ 0_{3\times3} \end{bmatrix}, \text{ and } J_r = \begin{bmatrix} 0_{3\times3} \\ R^\top \end{bmatrix}.$$

It then follows that:

$$\begin{bmatrix} \delta\phi \\ \delta r \end{bmatrix} = \begin{bmatrix} I_3 & 0 \\ 0 & R \end{bmatrix} \delta p.$$

1.2 Problem Definitions

Let $A, S, O, W \in \mathbb{E}^3$ and assume that the point A corresponds to the center of mass of the small celestial body, S corresponds to the center of mass of the spacecraft, O corresponds to the center-of-mass of the Sun, and W corresponds to an inertial point in space, e.g., non-accelerating, constant velocity. Initially, we distinguish three frames of interest: the inertial frame $\mathcal{J} \triangleq (W, \{\vec{n}_i\}_{i=1}^3)$, and the spacecraft body-fixed frame $\mathcal{S} \triangleq (S, \{\vec{s}_i\}_{i=1}^3)$, and an arbitrarily chosen small body-fixed frame $\mathcal{G} \triangleq (G, \{\vec{g}_i\}_{i=1}^3)$. Note that since frame $\mathcal{G}$ is fixed with respect to small celestial body, and assuming that the small body is a rigid body, the position of the small celestial body's center of mass point A with respect to the point G in frame $\mathcal{G}$ coordinates, denoted $\mathbf{r}_{AG}^{\mathcal{G}}$, is fixed.

Given an inertial point W, the inertial absolute position vector of the observing spacecraft is denoted $r_{SW}$ and that of the small celestial body $r_{AW}$. The relative position vector of the observing spacecraft is then given as $r_{SA} = r_{SW} - r_{AW}$. The inertial relative velocity vector of the observing spacecraft is denoted by $$v_{SA} \triangleq \mathcal{J} \frac{d}{dt}(r_{SA}).$$

In the same fashion, the inertial relative acceleration is denoted $$a_{SA} \triangleq \mathcal{J} \frac{d}{dt}(v_{SA}).$$

To later exploit knowledge of the relative orbital pose, we decompose the relative position vector $r_{SA}$ using the intermediary point G fixed in the g-frame coordinates, such that $r_{SA} = r_{SG} + r_{GA} = r_{SG} - r_{AG}$. Expressing in the body-fixed g-frame coordinates and writing as a function of the relative position vector, we get the relative pose translation vector:

$$\mathbf{r}_{SG}^{\mathcal{G}} + R_{\mathcal{GS}} R_{\mathcal{SJ}} \mathbf{r}_{SA}^{\mathcal{J}} + \mathbf{r}_{AG}^{\mathcal{G}} \quad (4)$$

Figure 2:
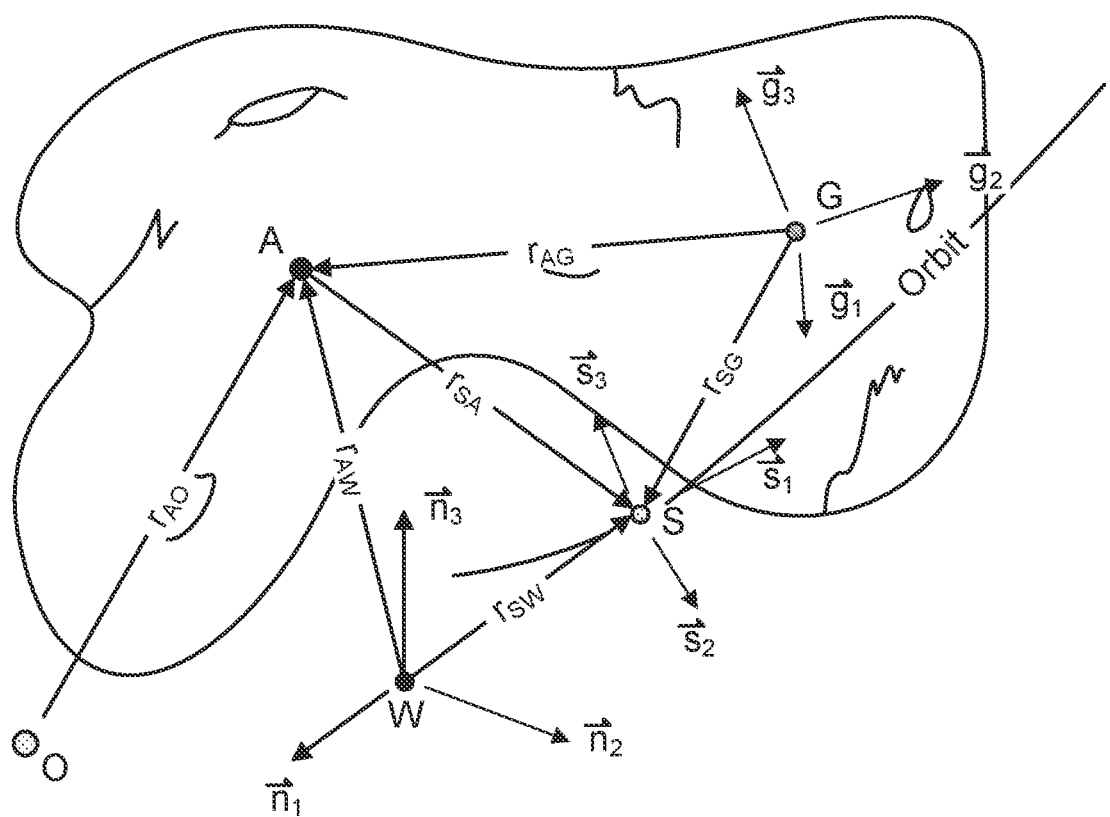
FIG. 2 is an illustration of relative navigation problems frame definitions and vector quantities.

Any reference hereafter to the relative pose of the spacecraft 102, for a given spacecraft frame $\mathcal{S} = (S, \{\vec{s}_i\}_{i=1}^3)$, designates the transformation:

$$T_{\mathcal{GS}} = \begin{bmatrix} R_{\mathcal{GS}} & \mathbf{r}_{SG}^{\mathcal{G}} \\ 0_{1\times3} & 1 \end{bmatrix}, \quad (5)$$

which encodes the relative rotation $R_{\mathcal{GS}} \triangleq [\vec{s}_1^{\mathcal{G}} \ \vec{s}_2^{\mathcal{G}} \ \vec{s}_3^{\mathcal{G}}]^T \in SO(3)$ of the spacecraft 102 with respect to the $\mathcal{G}$ frame and the coordinates $\mathbf{r}_{SG}^{\mathcal{G}} = \vec{s}_1^{\mathcal{G}} [r_{sg} \cdot \vec{g}_1, r_{sg} \cdot \vec{g}_2, r_{sg} \cdot \vec{g}_3] \in \mathbb{R}^3$ of the spacecraft position vector relative to the point G as expressed in the $\mathcal{G}$ frame. FIG. 2 provides an illustration 200 of the problem's relevant points, vectors, and frames, as defined above.

1.3. Scene Mapping Considerations

Let $t_0$ be the initial time, let $t \geq t_0$, let $(t_k)_{k=0}^n \subset [t_0, t]$ be the sequence of sensor acquisition times, and let $T_{\mathcal{G}_k \mathcal{S}_k} \triangleq T_{\mathcal{GS}}(t_k)$ describe the pose of the spacecraft 102 as expressed in the $\mathcal{G}$ frame at each time index $0 \leq k \leq n$. Then, the sequence $(T_{\mathcal{G}_k \mathcal{S}_k})_{k=0}^n \in \Pi_{k=1}^n SE(3)$ describes the discrete trajectory of the relative pose of the spacecraft 102. We define the camera sensor frame $\mathcal{C} = (S, \{\vec{c}_i\}_{i=1}^3)$, with fixed pose $T_{\mathcal{SC}}$ with respect to the spacecraft frame $\mathcal{S}$, and obtain the sequence $(T_{\mathcal{G}_k \mathcal{C}_k})_{k=1}^n$ of all camera poses, also known as frames, where the relative camera pose is $T_{\mathcal{G}_k \mathcal{C}_k} = T_{\mathcal{G}_k \mathcal{S}_k} T_{\mathcal{S}_k \mathcal{C}_k} = T_{\mathcal{G}_k \mathcal{S}_k} T_{\mathcal{SC}}$, (k=0, . . . , n).

A landmark $L \in \mathbb{E}^3$ is defined as a notable 3D point in the scene, which is potentially triangulated during SLAM using camera observations. We denote by $\Psi_k = \{L_i \in \mathbb{E}^3, i=1, \ldots, m_k\}$ the set of all landmarks accumulated up until time index k=0, . . . , n, also called the map at time index k. To each landmark $L \in \Psi_k$ corresponds a position vector $r_{LG} \in \mathbb{R}^3$, whose coordinates in the $\mathcal{G}$ frame, denoted $\mathbf{r}_{LG}^{\mathcal{G}}$, are fixed since the small body is presumed to be a rigid body. Let $r_k$ be the total number of image feature points detected in the camera image captured at time $t_k$, k=0, . . . , n. We collect all detected feature points in the set $\gamma_k = \{P_i \in \mathbb{P}^2, i=1, \ldots, r_k\}$ where, to each $P_i \in \gamma_k$ are associated the ideal 2D image coordinates $y_{ik} \in \mathbb{R}^2$.

Assume a point $P_i \in \gamma_k$ corresponds to the image projection of a scene landmark $L_j \in \Psi_k$, as captured at time index k. The 2D image coordinates $y_{ik}$ relate to the 3D position coordinates $r_{L_jG}^G$ through the pinhole camera model relationship, given by:

$$\begin{bmatrix} \lambda y_{ik} \\ \lambda \end{bmatrix} = K r_{C_aG_k} \xi_{L_jG}^\xi, \quad (6)$$

where $\lambda > 0$ is a scaling factor, and where:

$$K \triangleq \begin{bmatrix} f_x & 0 & c_x & 0 \\ 0 & f_y & c_y & 0 \\ 0 & 0 & 1 & 0 \end{bmatrix}$$

is the camera intrinsic matrix, with $f_x$, $f_y$, $c_x$, $c_y$ scalars corresponding to the known camera focal lengths and optical center offsets along the two image dimensions. The real measured feature point coordinates $y_{ik}^m$ are then defined such that:

$$y_{ik}^m = y_{ik} + v_y, \quad (7)$$

where $v_y \sim \mathcal{N}(0, \Sigma_y^m)$ corresponds to the feature point measurement noise, with associated 2×2 covariance matrix $\Sigma_y^m$. We collect all real camera frame-landmark observations up until time index $k=0, \ldots, n$ in the set $\mathcal{Y}_k \triangleq \{y_{ij}^m \in \mathbb{R}^2 : i=1, \ldots, r_j=0, \ldots, k\}$. We also define $\mathcal{X}_k \triangleq \{T_{G_iS_i} \in SE(3): i=0, \ldots, k\}$ as the set of all possible spacecraft relative poses discretized at times $(t_k)_{k=0}^n$, and define $\mathcal{L}_k \triangleq \{r_{LG}^G \in \mathbb{R}^3 : L \in \Psi_k\}$ as the set of all landmark coordinates mapped up until time index $k=0, \ldots, n$.

By exploiting the multi-view geometry constraints derived by capturing observations $\mathcal{Y}_k$ of the landmarks $\Psi_k$ at poses $\mathcal{X}_k$, as well as the constraints derived from the intrinsic motion of the spacecraft 102 around the small body 101 and other sensor measurements, further detailed in Section 3, we wish to find a solution to the trajectory $\mathcal{X}_k$ along with the set of mapped landmark coordinates $\mathcal{L}_k$, on-the-fly, for $k=0, \ldots, n$ in a sequential and incremental manner. The method employed to solve this problem is described in Section 4. First, we provide a brief primer on the Bayesian estimation, the SLAM problem formulated in the Bayesian framework, and the relevance of representing the structure of the problem using a factor graph.

2. Estimating Relative Motion Using IMU Measurements

We now further explain the improvements of our work compared to prior art methods, specifically: (a) why the IMU preintegration scheme used in prior works is inadequate and why relative dynamics need to be considered; and (b) why the kinematic rotation factor used in prior art methods may be modified to account for non-inertial and large motion of the target center-of-mass point.

2.1. Using IMU Accelerometer Measurements to Perform Dead-Reckoning in the Presence of Unknown Gravity Vector In the scenario described herein: (1) in terms of gravitational forces, the observing spacecraft 102 is affected by the combined pull of the target small celestial body 101 and of the Sun, while the small celestial body 101 is only affected by the gravitational acceleration of the Sun. This results in a net non-negligible relative gravitational interaction between the "chief" (the small celestial body 101) and the "deputy" (the observer S/C), which, in turn, affects the relative motion of the observer spacecraft. However, an IMU accelerometer is insensitive to gravitational forces. The double integrator dynamics do not hold over extended arcs of time, and a full non-linear treatment provides higher precision; (2) there are persistent external non-gravitational forces acting on the observer spacecraft 102 which are small in magnitude, and consequently may not be detectable given the signal-to-noise ratio (SNR) of an IMU measurement signal, but which may still affect the long-term trajectory of the observing spacecraft over an inspection arc. The IMU measurements required for the IMU factors incorporated in prior art methods may not capture the accumulated effect of such small-scale non-gravitational forces; (3) unlike spacecraft inspection arcs, the duration of small celestial body inspection arcs is typically extended—that is, their length is a non-negligible portion of the period of revolution of the spacecraft around the small celestial body. Assuming that the center-of-mass of the target body only moves negligibly between time instances, or that its motion is inertial throughout the inspection arc, may induce considerable relative navigation errors during estimation.

When we analyze the SPHERES-VERTIGO platform-inspired problem formulation, we note that the inspector spacecraft (deputy) and the ISS habitat module in which the experiment is run (chief) are both subjected to the same Earth gravitational acceleration which maintains them in orbit, without any other gravitational interaction between the two. The ISS frame, being nadir-pointing, may be assimilated to the Hill frame, and consequently the relative motion of the observer spacecraft with respect to the Hill frame is fundamentally described by the Clohessey-Wiltshire (CW) equations of motion. We note that the target spacecraft (another deputy) has a similar relationship to the ISS frame (chief), but its coordinate is coincident with that of the Hill frame and assumed to be inertial. In this specific context, given the very small difference in Earth-centered inertial position between the chief (ISS module) and the deputy (observer) spacecraft, and the short time-frame of the considered experiment, the Hill frame may be considered as quasi-inertial and the motion of the observer may indeed be approximated by the solution to double-integrator dynamics. Only in this limited scenario, the simple accelerometer model where gravity is set to zero and acceleration measurements are simulated as thruster-specific forces, seems valid.

In the latter case, the accelerometer measurements may be used to perform "dead-reckoning," that is, to compute the change in the inertial velocity and the inertial position of the observer spacecraft with respect to the quasi-inertial world frame due to the influence of external accelerations, such as the action of thruster firing. Such dead-reckoning may be performed using a pre-integration factor, which attempts to encode the residual between the current state estimate and the state obtained by preintegration of these accelerometer measurements starting from the previous navigational state.

However, as is generally known that an IMU's accelerometer does not measure pure accelerations, but rather externally applied non-gravitational specific forces, that is, inertial accelerations sans gravity-induced accelerations.

The IMU measurements do not provide any information about the direction or the magnitude of the gravity vector in freefall (unforced orbital) motion. We can intuit this fact by considering a simple model for the measurement $\mathbf{n}_{MO}^{\mathcal{M},m}$ of an accelerometer centered at point M and with frame $\mathcal{M}$, given as:

$$\mathbf{n}_{MO}^{\mathcal{M},m} = cR_{\mathcal{M}\mathcal{J}}\mathbf{a}_{MO}^{\mathcal{J}} - \mathbf{g}^{\mathcal{J}}) + v, \quad (8)$$

where O is an inertial point, $\mathcal{J}$ is an inertial frame, c is a measurement sensitivity constant, $R_{\mathcal{MJ}}$ is the rotation between frames $\mathcal{M}$ and $\mathcal{J}$, and v is a Gaussian noise term. It follows that, in an unforced (freefall) motion, while assuming the IMU frame $\mathcal{M}$ is coincident with the spacecraft body frame $\mathcal{S}$, only gravity affects the IMU, i.e. $\mathbf{a}_{MO}^{\mathcal{J}} = \mathbf{g}^{\mathcal{J}}$, and thus the accelerometer measurement over time is null on average. In other words, the IMU accelerometer is unusable for the purpose of generating estimates of inertial velocity and change in inertial position by dead-reckoning in the presence of unknown gravitational accelerations. To obtain an accurate estimate of inertial motion, $\mathbf{g}^{\mathcal{J}}$ needs to be known.

2.2. Using IMU Accelerometer Measurements to Perform Dead-Reckoning of Motion Owing to Small-Scale Persistent Perturbing Forces Admittedly, accelerometer measurements may be used in our work to obtain estimates of motion owing only to non-gravitational external forces being applied on the S/C, such as actuated thruster profiles. However, such forces need to be strong enough to generate a large enough signal-to-noise ratio to be useful. One common external force which does not meet the latter requirement, but whose effect on the trajectory is non-negligible over the length of an inspection arc, is solar radiation pressure (SRP). Its magnitude is typically orders of magnitude smaller than the gravitational effect, and it does not meet the criterion of having enough SNR to be detectable by the accelerometer.

In light of these caveats, incorporating IMU factors to process such IMU measurements, given that we need to augment the state with the additional IMU bias states and incur additional computation time, may not be justifiable. Therefore, an admissible "odometric" factor for our scenario would then have to rely on explicitly modeling and tracking the gravity vector, to ascertain the true relative motion between the observer spacecraft and the target small celestial body. Moreover, since the center-of-mass of the small celestial body may not be considered as inertial owing to the gravitational pull by the Sun over the inspection arc, and its inertial velocity may not be known with good precision during proximity operations, it is preferable to model the relative dynamics of the spacecraft-small celestial body pair, by avoiding the modeling of the inertial dynamics of both spacecraft and target small celestial body separately.

3. Relative Kinematic and Orbital Odometric Factors

In this section, we detail the theoretical approach for devising an adaptation of Setterfield's kinematic rotation factor as well as our new RelDyn factor, which enforces a strong odometric constraint, namely, the equations governing the motion of the spacecraft relative to the small celestial body, and which incorporates fusion of other sensor measurements. We also discuss the relevant sources of noise, and the propagated system of equations.

3.1. Factor Graph Encoding and ISAM2 Algorithm

In modern renditions of SLAM, the problem stated in Section 1.2 is formulated using a probabilistic inference framework, predicated on Bayesian estimation, which we evoke for our solution in this section. The use of the factor graph formulation for modeling the small body navigation problem is motivated by the fact that the typical Bayesian estimation method used to solve the SLAM estimation problem is amenable to a graph representation due to the sparsity in the structure of the cost. Factor graphs are un-directed bi-partite probabilistic graphical models constituted of factor nodes and variable nodes, with edges connecting variable-factor pairs. The structure captured by the edges and nodes of the factor graph encodes the structure of the estimation problem's posterior probability density function, by exploiting the fact that the latter can be factorized as a product of many functions, each depending on a subset of the variables of the problem. By exploiting sparsity in the structure of the joint density function, the factor graph formulation can render very large estimation problems tractable in terms of computation. Factor functions can be derived and emplaced in the factor graph based on the problem-specific constraints which we wish to include.

Given a constructed factor graph and a specific variable ordering, variable elimination is performed, transforming the factor graph into a chordal Bayes net. We note that, in theory, the chordal Bayes net may then be written as an equivalent square root information matrix, which may then be solved using algebra (back-substitution) when the factors are linear, and by Gauss-Newton iteration when the factors are non-linear. The procedure creates the resulting Gauss-Newton iteration directly from the factor graph and then attempts to solve for updated values of the variable set.

However, in more recent and efficient renditions of factor graph solvers, Bayes trees are used to store internally the structure of the problem, while the factor graph is used principally as an intermediary for modeling. A Bayes tree is a type of directed junction tree in which the nodes store the cliques of the chordal Bayes net it represents and the edges are the separator set of variables which separate the cliques.

In iSAM2, specifically, after a first step variable elimination step is performed on the initial factor graph, a Bayes tree is constructed from the chordal Bayes net and stored for the next time step, contrary to the classical approach of storing the factor graph itself for the next stage. When a new subgraph relating to a set of new variables and measurements is available for insertion, iSAM2 updates the Bayes tree by (1) converting the part of the Bayes tree relating to this new subgraph into a factor graph, (2) appending the new factor subgraph—usually at the top of the tree, i.e. affecting the most recent cliques—then (3) eliminating the factor subgraph to produce a new Bayes net, and (4) reassesses the affected cliques, (5) updates the appropriate variables. iSAM2 updates variables involved in non-linear factors by performing a non-linear optimization step at a current linearization point. To select which variables undergo optimization update, iSAM2 first marks all variables in a subset of the graph variables—that is, the ones being added to the graph—which clear the "wildfire" threshold to update, after which a new linearization point is computed and subsequent all cliques which involve the updated variable get marked for update as well.

These points of the procedure are important in that they dictate the effect on the iSAM2 runtime and complexity when we insert variables which may render the graph fully connected, greatly affecting the size of the cliques marked for update and optimization. We further discuss these in Section 4.1. Next, we devise the factor which serves as a motion constraint in the small body circumnavigation problem.

3.2. The Relative Kinematic Factor Formulation

A kinematic rotation factor is incorporated it in the problem factor graph. Unlike the kinematic rotation factors, however, we do not assume that the target's (i.e., the body 101) center-of-mass point A is inertial or that the motion of the target's center-of-mass between two successive time indices is negligible. Therefore, for any two time indices i, j, i≠j, $r_{A_jA_i} \neq 0$, and we can write:

$$r_{S_jS_i} = r_{S_jG_j} + r_{G_jA_j} + r_{A_jA_i} + r_{A_iG_i} + r_{G_iS_i} \quad (9)$$

We re-write the left hand side of equation (9) by transiting through points $A_j$ and $A_i$ in the vector chain, such that:

$$r_{S_jS_i} = r_{S_jA_j} + r_{A_jA_i} + r_{A_iS_i} \quad (10)$$

We replace equation (10) into the equation (9), cancel out terms, and manipulate to obtain the kinematic relationship, stated as:

$$r_{S_jA_j} - r_{S_iA_i} = r_{S_jG_j} + r_{G_jA_j} + r_{A_iG_i} + r_{G_iS_i} \quad (11)$$

We note that in lieu of a inertial position vectors $r_{S,W}$ with respect to an inertial world frame origin W used is other works, we have the relative vector $r_{S_jA_i}$. While acknowledging that the center-of-mass vector $r_{AG}$ is fixed when expressed in the $\mathcal{G}$-frame coordinates, such that $$r_{A_iG_i}^{\mathcal{G}_i} = r_{A_jG_j}^{\mathcal{G}_j} = r_{AG}^{\mathcal{G}},$$

and expressing all vectors in the inertial frame, we get the kinematic relationship:

$$r_{S_jA_j}^{\mathcal{J}} - r_{S_iA_i}^{\mathcal{J}} = R_{\mathcal{J}S_j} R_{S_jG_j}(r_{S_jG_j}^{\mathcal{G}_j} - r_{AG}^{\mathcal{G}}) + R_{\mathcal{J}S_i} R_{S_iG_i}(r_{AG}^{\mathcal{G}} - r_{S_iG_i}^{\mathcal{G}_i}). \quad (12)$$

Further assuming that we have access to a filtered estimate $\hat{R}_{\mathcal{J}S}$ of the inertial attitude $R_{\mathcal{J}S} = \hat{R}_{\mathcal{J}S} \exp([v_R]^\wedge)$, $v_{R,i} \sim \mathcal{N}(0, \tau_R)$ from the spacecraft's inertial star tracker at any desired time, we may re-write equation (12) as:

$$r_{S_jA_j}^{\mathcal{J}} - r_{S_iA_i}^{\mathcal{J}} = \hat{R}_{\mathcal{J}S_j} \exp([-v_{R,j}]^\wedge) R_{S_jG_j}(r_{S_jG_j}^{\mathcal{G}_j} - r_{AG}^{\mathcal{G}}) + \hat{R}_{\mathcal{J}S_i} \exp([-v_{R,i}]^\wedge) R_{S_iG_i}(r_{AG}^{\mathcal{G}} - r_{S_iG_i}^{\mathcal{G}_i}). \quad (13)$$

Using Facts 1 and 3, and manipulating equation (13), we obtain the translation residual:

$$\varepsilon_{ij}^{RelKin,r} \triangleq r_{S_jA_j}^{\mathcal{J}} - r_{S_iA_i}^{\mathcal{J}} - \hat{R}_{\mathcal{J}S_i} R_{S_iG_i}(r_{S_iG_i}^{\mathcal{G}_i} - r_{AG}^{\mathcal{G}}) - \hat{R}_{\mathcal{J}S_i} R_{S_iG_i}(r_{AG}^{\mathcal{G}} - r_{S_iG_i}^{\mathcal{G}_i}) = [\hat{R}_{\mathcal{J}S_j} R_{S_jG_j}(r_{S_jG_j}^{\mathcal{G}_j} - r_{AG}^{\mathcal{G}})]^\wedge \hat{R}_{\mathcal{J}S_j} v_{R,j} + [\hat{R}_{\mathcal{J}S_i} R_{S_iG_i}(r_{AG}^{\mathcal{G}} - r_{S_iG_i}^{\mathcal{G}_i})]^\wedge \hat{R}_{\mathcal{J}S_i} v_{R,i}. \quad (14)$$

While assuming that $\mathbb{E}[v_{R,i} v_{R,j}^T] = 0_{3\times3}$, i≠j, and using the shorthand $$B_i \triangleq [\hat{R}_{\mathcal{J}S_i} R_{S_iG_i}(r_{AG}^{\mathcal{G}} - r_{S_iG_i}^{\mathcal{G}_i})]^\wedge,$$

an expression for the covariance of $\varepsilon_{ij}^{RelKin,r}$ may be found by computing:

$$\mathbb{E}[\varepsilon_{ij}^{RelKin,r}(\varepsilon_{ij}^{RelKin,r})^T] = B_i \Sigma_R B_i^T + B_j \Sigma_R B_j^T. \quad (15)$$

In parallel, we can write the rotation kinematic relationship using the rotation composition rule, given as:

$$R_{\mathcal{G}_i\mathcal{G}_j} = R_{\mathcal{G}_iS_i} R_{S_i\mathcal{J}} R_{\mathcal{J}S_j} R_{S_j\mathcal{G}_j}. \quad (16)$$

We rewrite the left-hand side of the equation using the intermediary $\mathcal{J}$ frame, such that:

$$R_{\mathcal{G}_i\mathcal{G}_j} = R_{\mathcal{G}_i\mathcal{J}} R_{\mathcal{J}\mathcal{G}_j}. \quad (17)$$

Using an Euler on-manifold integration scheme with the simplifying assumption of piecewise constant $\omega_{\mathcal{G}\mathcal{J}}(t) = \omega_{\mathcal{G}_i\mathcal{J}}$, $t \in [t_i, t_j)$, a kinematic relationship between $R_{\mathcal{J}\mathcal{G}_i}$ and $R_{\mathcal{J}\mathcal{G}_j}$ holds, such that:

$$R_{\mathcal{J}\mathcal{G}_j} = R_{\mathcal{J}\mathcal{G}_i} \exp([\omega_{\mathcal{G}_i\mathcal{J}}^{\mathcal{G}_i}(t_j - t_i)]^\wedge). \quad (18)$$

Substituting equation (18) into equation (17), and then substituting that result into equation (16), we obtain the kinematic relationship:

$$\exp([\omega_{\mathcal{G}_i\mathcal{J}}^{\mathcal{G}_i}(t_j - t_i)]^\wedge) = R_{\mathcal{G}_iS_i} R_{S_i\mathcal{J}} R_{\mathcal{J}S_j} R_{S_j\mathcal{G}_j}. \quad (19)$$

Further assuming that we have access to a filtered estimate $\hat{R}_{\mathcal{J}S_j}$ of the inertial attitude $R_{\mathcal{J}S_i} = \hat{R}_{\mathcal{J}S_i} \exp([v_{R,i}]^\wedge)$, $v_{R,i} \sim \mathcal{N}(0, \Sigma_R)$ from the spacecraft's inertial star tracker, we may re-write equation (19) as:

$$\exp([\omega_{\mathcal{G}_i\mathcal{J}}^{\mathcal{G}_i}(t_j - t_i)]^\wedge) = R_{\mathcal{G}_iS_i} \exp([v_{R,i}]^\wedge) \hat{R}_{S_i\mathcal{J}} \hat{R}_{\mathcal{J}S_j} \exp([-v_{R,j}]^\wedge) R_{S_j\mathcal{G}_j}.$$

Using Fact 2, and manipulating the right-hand side of the latter equation, we obtain:

$$R_{\mathcal{G}_jS_j} \hat{R}_{S_j\mathcal{J}} \hat{R}_{\mathcal{J}S_i} R_{S_i\mathcal{G}_i} \exp([\omega_{\mathcal{G}_i\mathcal{J}}^{\mathcal{G}_i}(t_j - t_i)]^\wedge) = \exp([R_{\mathcal{G}_jS_j} \hat{R}_{S_j\mathcal{J}} \hat{R}_{\mathcal{J}S_i} v_{R,i}]^\wedge) \exp([-R_{\mathcal{G}_jS_j} v_{R,j}]^\wedge).$$

Taking the logarithm map followed by the vee operator on both sides of the equation, and then applying the Baker-Campbell-Hausdorff formula while omitting any second-order noise term, we obtain the residual:

$$\varepsilon_{ij}^{RelKin,R} \triangleq \log(R_{\mathcal{G}_jS_j} \hat{R}_{S_j\mathcal{J}} \hat{R}_{\mathcal{J}S_i} R_{S_i\mathcal{G}_i} \exp([\omega_{\mathcal{G}_i\mathcal{J}}^{\mathcal{G}_i}(t_j - t_i)]^\wedge))^\vee = R_{\mathcal{G}_jS_j} \hat{R}_{S_j\mathcal{J}} \hat{R}_{\mathcal{J}S_i} v_{R,i} - R_{\mathcal{G}_jS_j} v_{R,j}. \quad (20)$$

Since (a) rotation matrices are full rank and norm preserving, (b) the star tracker measurement noise is typically isotropic, e.g. $\Sigma_R = \sigma_R^2 I_3$, and (c) that the star tracker measurement noises $v_{R,j}, v_{R,i}$ are independent for i≠j, that is $\mathbb{E}[v_{R,j} v_{R,i}^T] = 0_{3\times3}$, it follows that $\varepsilon_{ij}^{RelKin,R} \sim (0, 2\tau_R)$.

We combine the two residuals to obtain the full relative kinematic factor:

$$\varepsilon_{ij}^{RelKin} = \begin{bmatrix} \varepsilon_{ij}^{RelKin,R} \\ \varepsilon_{ij}^{RelKin,r} \end{bmatrix} \sim \mathcal{N}\left(0, \begin{bmatrix} 2\Sigma_R & 0 \\ 0 & B_i \Sigma_R B_i^T + B_j \Sigma_R B_j^T \end{bmatrix}\right). \quad (21)$$

We incorporated this adapted factor into our factor graph formulation.

3.3. The RelDyn Factor Formulation

We derive a relative dynamics factor based on the moments of the distribution describing the dispersion of the solution realizations of a system of nonlinear stochastic differential equations, evaluated at discrete times, for the purpose of improving the performance of baseline SLAM for small celestial body imagery.

Given a sequence of spacecraft states $\Xi_n = (x_k)_{k=0}^n$ at discrete times $(t_k)_{k=0}^n$, for k=1, ..., n, we want to devise factors which relate to the odometric probability distribution $p(x_k, x_{k+1})$. Note that, using Bayes' rule, the joint distribution $p(x_k, x_{k+1})$ can be rewritten as either $p(x_k, x_{k+1}) = p(x_{k+1} | x_k) p(x_k)$ or $p(x_k, x_{k+1}) = p(x_k | x_{k+1}) p(x_{k+1})$, depending on which prior, $p(x_k)$ or $p(x_{k+1})$, is readily available at the time of computation. In our case, we typically know the state of the spacecraft and the distribution of the uncertainty of that state at the beginning of a segment, and therefore we pick $p(x_0) \sim \mathcal{N}(\hat{x}_0, \Sigma_0)$ as a known prior, where $\hat{x}_0$ is the known state mean and $\Sigma_0$ is the known state covariance. We associate the factor $\phi_0^{prior}(x_0)$ to the prior $p(x_0)$ accordingly. Now, the RelDyn factor $\phi_k^{RelDyn}$ can be formulated as:

$$\phi_k^{RelDyn}(x_k, x_{k+1}) \propto p(x_{k+1}|x_k) = \mathcal{N}(0, P_k), \tag{22}$$

where $P_k$ is a covariance matrix derived from the propagation of the moments of the distribution describing the realizations of the stochastic differential equations.

Figure 3:
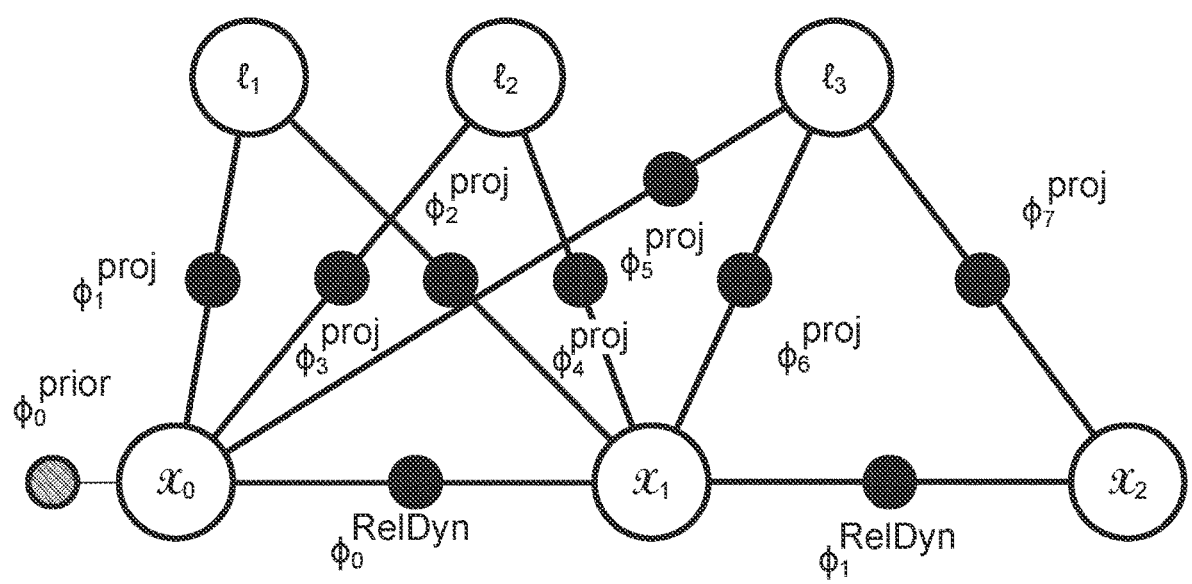
FIG. 3 is an illustration of a factor graph encoding the SLAM problems and the RelDyn factors.

Along with projection factors, denoted $\phi_i^{proj}$, $i=1, \ldots, r_k$, a factor graph of the SLAM problem with motion priors can be constructed, as conceptually illustrated in the graph 300 of FIG. 3.

In light of this goal, a brief discussion of the RelDyn factor is provided throughout this section. To compute the value of the RelDyn, we need to model the equations of the relative motion induced by the relative navigation problem in the presence of gravitational attraction between the observer and target bodies.

3.4. Equations of Relative Motion

Recalling the vectors and frames od FIG. 2, we assume that the frame $\mathcal{J}$ is inertially fixed, the frames $\mathcal{G}$ and $\mathcal{S}$ are rotating with associated inertial angular velocity vectors $\omega_{\mathcal{GJ}}$, and $\omega_{\mathcal{SJ}}$, and that frame $\mathcal{G}$ is a target small celestial body-fixed frame. The relative angular velocity between the spacecraft frame $\mathcal{S}$ and frame $\mathcal{G}$ is $\omega_{\mathcal{SG}} = \omega_{\mathcal{SJ}} - \omega_{\mathcal{GJ}}$. The orientation of the frame $\mathcal{S}$ relative to the frame $\mathcal{G}$ is encoded in the rotation matrix $R_{\mathcal{GS}} \in SO(3)$, which satisfies the kinematic relationship:

$$\dot{R}_{\mathcal{GS}} = [\omega_{\mathcal{SG}}^{\mathcal{G}}] \cdot R_{\mathcal{GS}}, \tag{23}$$

where $\omega_{\mathcal{SG}}^{\mathcal{G}} \in \mathbb{R}^3$ is the relative angular velocity, expressed in the g frame. Rewriting (23) in terms of the frame $\mathcal{S}$ and frame $\mathcal{G}$ angular velocities, and using Fact 1, we obtain:

$$\dot{R}_{\mathcal{GS}} = R_{\mathcal{GS}} \omega_{\mathcal{SJ}}^{\mathcal{S}} - \omega_{\mathcal{GJ}}^{\mathcal{G}}] \cdot R_{\mathcal{GS}} = R_{\mathcal{GS}} [\omega_{\mathcal{SJ}}^{\mathcal{S}}] - [\omega_{\mathcal{GJ}}^{\mathcal{G}}] \cdot R_{\mathcal{GS}}. \tag{24}$$

We can derive the position vector of the spacecraft at point S relative to the arbitrary point G by writing:

$$r_{SG} = r_{SA} + r_{AG}.$$

Taking the time derivative in the g frame gives $$\mathcal{G} \frac{d}{dt}(r_{SG}) = \mathcal{G} \frac{d}{dt}(r_{SA}) + \mathcal{G} \frac{d}{dt}(r_{AG}) = \mathcal{J} \frac{d}{dt}(r_{SA}) - \omega_{\mathcal{GJ}} \times r_{SA}.$$

Expressing in the $\mathcal{G}$ coordinates, we get:

$$\dot{r}_{SG}^{\mathcal{G}} = R_{\mathcal{GS}} R_{\mathcal{SJ}} v_{SA}^{\mathcal{J}} - [\omega_{\mathcal{GJ}}^{\mathcal{G}}] \cdot R_{\mathcal{GS}} R_{\mathcal{SJ}} r_{SA}^{\mathcal{J}}. \tag{25}$$

Finally, we derive the translational dynamics of the spacecraft relative to the small body center of mass. Our equations of motion for the relative position and relative velocity are then given as:

$$\dot{r}_{SA}^{\mathcal{J}} = v_{SA}^{\mathcal{J}} \tag{26}$$

$$\dot{v}_{SA}^{\mathcal{J}} = a_{SA}^{\mathcal{J}}. \tag{27}$$

It thus suffices to find an expression for $a_{SA}^{\mathcal{J}}$.

We assume herein that the spacecraft 102 is subjected to the gravitation force of the small body 101, denoted by $F_{sa}$, the gravitation of the Sun, denoted by $F_{s\odot}$, the solar radiation pressure (SRP), denoted by $F_{SRP}$, as well as the spacecraft actuation thrust force, denoted by $F_s$. Assuming that the spacecraft's known mass, denoted by $m_s$, is fixed, the linear acceleration of the spacecraft with respect to the Sun's origin O, is given by $a_{SO} = 1/m_s (F_{sa} + F_{s\odot} + F_{SRP} + F_s)$. The small body's gravitation force is obtained by computing:

$$F_{sa} = \frac{\partial U(r)}{\partial r}\bigg|_{r=r_{SA}} \tag{28}$$

For an appropriate gravity field potential function $U(r)$. Assume that $U(r)$ is parameterized using spherical harmonics. Then, when the probe 102 is relatively distant from the small body 101, the spherical term of the potential dominates, in which case the attractive force is given by $F_{sa} = -\mu_a m_s / \|r_{SA}\|^3 r_{SA}$. Consider the Sun as a point-mass central body. Then, $F_{s\odot} = -\mu_\odot m_s / \|r_{SO}\|^3 r_{SO}$, where $r_{SO}$ is the position vector of the spacecraft 102 center of mass S with respect to the Sun origin O. Assume that the solar radiation pressure is a function of its position vector with respect to the Sun, $F_{SRP} = F_{SRP}(r_{SO})$.

In turn, we assume that the mass of the small body 101, denoted $m_a$ is fixed, and that the only force acting on the small body 101 is the Sun's gravitational force. Then, the linear acceleration of the small body center of mass with respect to the Sun's origin O, is given by $a_{AO} = 1/m_a F_{a\odot}$, where $F_{a\odot} = -\mu_\odot m_a / \|r_{AO}\|^3 r_{AO}$. The relative dynamics of the spacecraft-small celestial body system are obtained computing $a_{SA} = a_{SO} - a_{AO}$, leading to the relationship:

$$a_{SA} = -\frac{\mu_a}{\|r_{SA}\|^3} r_{SA} - \frac{\mu_\odot}{\|r_{SO}\|^3} r_{SO} + \frac{1}{m_s} F_{SRP}(r_{SO}) + \frac{1}{m_s} F_s + \frac{\mu_\odot}{\|r_{AO}\|^3} r_{AO}. \tag{29}$$

Assume that $r_{SO} \cong r_{AO}$, given the very large distance between the spacecraft-small celestial body system and the Sun, and rewrite equation (29) by making explicit in terms of the state variables and input variables of interest, yielding:

$$a_{SA}^{\mathcal{J}} = -\left(\frac{\mu_a}{\|r_{SA}\|^3} + \frac{\mu_\odot}{\|r_{AO}\|^3}\right) r_{SA}^{\mathcal{J}} + \frac{1}{m_s} F_{SRP}^{\mathcal{J}}(r_{AO}^{\mathcal{J}}) + \frac{1}{m_s} R_{\mathcal{JS}} F_s^{\mathcal{S}}. \tag{30}$$

Additionally, for the sake of readability, we hereafter define the shorthand notation $Q \triangleq R_{\mathcal{GS}}$, $q = r_{SG}^{\mathcal{G}}$, $w \triangleq \omega_{\mathcal{GJ}}^{\mathcal{G}}$, $r \triangleq r_{SA}^{\mathcal{J}}$, $v \triangleq v_{SA}^{\mathcal{J}}$, $R \triangleq R_{\mathcal{JS}}$, $s \triangleq \omega_{\mathcal{SJ}}^{\mathcal{S}}$, $d \triangleq r_{AO}^{\mathcal{J}}$, $c \triangleq r_{AG}^{\mathcal{G}}$, $g(d) \triangleq 1/m_s F_{SRP}^{\mathcal{J}}(d)$, $f \triangleq 1/m_s F_s \mathcal{S}$, which allow us to restate the equations of motion as:

$$\dot{Q} = Q[s]^\wedge - [w]^\wedge Q, \tag{31}$$

$$\dot{q} = QR^\top v - [w]^\wedge QR^\top r \tag{32}$$

$$\dot{v} = -\left(\frac{\mu_a}{\|r\|^3} + \frac{\mu_\odot}{\|d\|^3}\right) r + g(d) + Rf \tag{33}$$

$$\dot{r} = v. \tag{34}$$

3.5. Modeling Assumptions

We note that we may view R and s, along with f, as inputs to the dynamical system described in (31)-(34). Here we consider $R=\hat{R}\exp([v_R]^\wedge)$ as the already-filtered estimate value $\hat{R}$ of the spacecraft's orientation provided by the inertial star tracker instrument, perturbed on the right by its associated uncertainty $v_R$, and $s=\hat{s}+v_s$ is the filtered and unbiased estimate value blacks of its angular velocity, provided by the rate gyro instrument, perturbed by the associated uncertainty $v_s$. This inclusion allows us to fuse the known filtered measurements of a star tracker system and a rate gyro into the overall navigation solution. Moreover, attitude and angular rate filtered measurements may be obtained at high rate and may therefore be associated in time so to closely coincide with the moment an image is taken and processed.

By modeling the sensor dynamics we avoid having to represent the Newton-Euler dynamics of the spacecraft 102. Indeed, attitude control inputs, such as the actual actuated torques applied on the spacecraft, are often not known with precision at the instant when they are applied on the spacecraft 102, but may be estimated a-posteriori. Yet, these would be required at the moment of integrating the vehicle's Newton-Euler equations of motion if implemented on-the-fly.

Furthermore, following our assumption that the small celestial body 101 is in single-axis rotation, we set the spin state vector $w_0 \triangleq w(t)$. Along with the unknown gravity parameter $\mu_a$, we may view $w_0$ as a parameter of the dynamical system.

For the purposes of the RelDyn factor modeling, we may now define the state tuple $x \triangleq (Q, q, v, r) \in SO(3) \times \mathbb{R}^3 \times \mathbb{R}^3 \times \mathbb{R}^3 \triangleq X$, the input tuple $u \triangleq (R, s, f) \in SO(3) \times \mathbb{R}^3 \times \mathbb{R}^3 \times \mathbb{R}^3 \triangleq U$, and the parameter tuple $p \triangleq (w_0, \mu_a) \in \mathbb{R}^3 \times \mathbb{R}_{>0} \triangleq P$. To be consistent with earlier representations, we note that by virtue of Fact 4, given any $Q$, $q$, we may construct the corresponding pose $T = T(Q, q)$.

Recall that the RelDyn factor function encodes the odometric constraint by means of a likelihood or prior distribution function predicated on the state and the known accumulated observations at discrete times. Therefore, we proceed as follows: (1) first, we identify and quantify the probability distribution which relates the dispersion of the state evolving over time. We wish to be able to evaluate this distribution at a sequence of a-priori unknown discrete times along the trajectory. We conserve two moments of this distribution, as is classically done in Gaussian process procedures; (2) we propagate the first moment (the mean state) by using the non-linear equations of motion, through an on-manifold integration technique; This provides us a means to evaluate the residual of the factor by comparing the propagated state against the next state; (3) we propagate the process covariance by linearizing the model dynamics around specific points, using a piece-wise constant assumption, and then integrate the linear model in the Lie algebra of the manifold. This provides us with a discrete process covariance matrix, which we use as a weighting in the factor formulation.

3.6. Stochastic Differential Equations of Motion

We assume that the dispersion of the state at any given time is due to the accumulated effect of exogenous perturbations on the trajectory across time. Specifically, we wish to exploit the stochastic form of the equations of motion to derive the distribution of trajectories as a function of time. Furthermore, to be able to evaluate the distribution at any desired time, we require the stochastic differential equations to be in continuous form. Finally, we desire to obtain the relevant stochastic differential equations directly from the equations of motion, as further detailed below, by admitting realistic and physical perturbations through the input channels.

To this end, let the 3-dimensional white noise Gaussian process $v_*(t)$ (where $*=R, s, f$), such that $\mathbb{E}[v_*(t)]=0$ and $\mathbb{E}[v_*(t)v_*^T(\tau)]=W_*\delta(t-\tau)$, where $W_*$ is the spectral density matrix of the continuous-time noise $v_*$. Additionally, we assume that $v_*$ for all $*=R, s, f$ are mutually uncorrelated.

Consider the equations of motion given in (31)-(34) and substitute in u, where for $\hat{u} \triangleq (\hat{R}, \hat{s}, \hat{f}) \in U$, we have $$u=(\hat{R}\exp([v_R]^\wedge), \hat{s}+v_s, \hat{f}+v_f).$$

To establish the governing stochastic differential equations of the system, we first define the 3-dimensional Wiener process $\varepsilon_*(t)$, ($*=R, s, f$), such that $$\varepsilon_*(t)=\int_0^t v_*(\tau)d\tau, \varepsilon_*(0)=0, \tag{35}$$

with the increment $d\varepsilon_*(t)=\varepsilon_*(t+dt)-\varepsilon_*(t)=v_*(t)\,dt$, satisfying $\mathbb{E}[\varepsilon_*(t)]=0$, $\mathbb{E}[(\varepsilon_*(t)-\varepsilon_*(\tau))(\varepsilon_*(t)-\varepsilon_*(\tau))^T]=W_*|t-\tau|$, which when $\tau \to t$ yields the relationship $\mathbb{E}[d\varepsilon_* d\varepsilon_*^T]=W_* dt$. Note also that $d\varepsilon_* dt=0$.

Given any two states $x_2=(Q_2, q_2, v_2, r_2) \in X$ and $x_1=(Q_1, q_1, v_1, r_1) \in X$, we define the error $\Delta_X(x_1, x_2) \in T_{x_1}X$ between $x_1$ and $x_2$ centered at $x_1$ such that:

$$\Delta_X(x_1, x_2) \triangleq \begin{bmatrix} \log(Q_1^T Q_2)^\vee \\ q_2 - q_1 \\ v_2 - v_1 \\ r_2 - r_1 \end{bmatrix}. \tag{36}$$

To obtain the stochastic differential equations resulting from this noise injection in the input, we evaluate the stochastic increment $dx(t)=\Delta_X(x(t), x(t+dt))$, we use Facts 2, 3 and 4 and we separate the equations, while dropping the time dependence for readability, yielding $$d\kappa = (Q^T dQ)^\vee = (\hat{s} - Q^T w_0)dt + d\varepsilon_s, \tag{37}$$

$$dr = (Q\hat{R}^T v - [w_0]^\wedge Q\hat{R}^T r)dt + (Q[\hat{R}^T v]^\wedge - [w_0]^\wedge Q[\hat{R}^T r]^\wedge)d\varepsilon_R \tag{38}$$

$$dv = \left(-\left(\frac{\mu_a}{\|r\|^3} + \frac{\mu_\odot}{\|d\|^3}\right)r + g(d) + R\hat{f}\right)dt - \hat{R}[\hat{f}]^\wedge d\varepsilon_R + Rd\varepsilon_f, \tag{39}$$

$$dr = v dt. \tag{40}$$

By decomposition of the covariances $W_* = L_* L_*^{-T}$, ($*=R, s, f$), and by defining the standard Wiener process $\varepsilon$, where $\mathbb{E}[d\varepsilon(t)]=0$ and $\mathbb{E}[d\varepsilon(t)d\varepsilon(t)^T]=I_9 dt$, obtain the system of stochastic differential equations (41):

$$d\kappa = f_Q(x, \hat{u}, p)dt + [0_{3\times 3} L_{Qs} 0_{3\times 3}]d\varepsilon,$$

$$dq = f_q(x, \hat{u}, p)dt + [L_{qR} 0_{3\times 3} 0_{3\times 3}]d\varepsilon,$$

$$dv = f_v(x, \hat{u}, p)dt + [L_{vR} 0_{3\times 3} L_{vf}]d\varepsilon,$$

$$dr = f_r(x)dt, \tag{41}$$

where $x=(Q, q, r, v) \in X$, $\hat{u}=(\hat{R}, \hat{s}, \hat{f}) \in U$, and $p=(w_0, \mu_a) \in P$, and where:

$L_{Qs}=I_3$, $L_{vR}=-\hat{R}[\hat{f}]^\wedge$, $L_{vf}=\hat{R}$, $L_{qR}=Q[\hat{R}^T v]^\wedge - [w_0]^\wedge Q[\hat{R}^T r]^\wedge$.

Collecting into $dx=[d\kappa^T\ dq^T\ dv^T\ dr^T]^T$, and into $f(x, \hat{u}, p)=[f_Q^T(x,\hat{u},p)\ f_q^T(x,\hat{u},p)\ f_v^T(x,\hat{u},p)\ f_r^T(x)]^T$, we can rewrite (41) in succinct form as:

$$dx = f(x, \hat{u}, p)dt + L(x, \hat{u}, p)d\varepsilon. \quad (42)$$

where $$L = \begin{bmatrix} 0_{3\times3} & L_{Qs} & 0_{3\times3} \\ L_{qR} & 0_{33} & 0_{3\times3} \\ L_{vR} & 0_{3\times3} & L_{vf} \\ 0_{3\times3} & 0_{3\times3} & 0_{3\times3} \end{bmatrix}. \quad (43)$$

Due to the non-linearity of the considered dynamical system in equation (42), the distribution of the Itô process x(t) may require more than two moments to fully describe at any time. However, as a stepping stone to obtain a practical representation of the distribution $p(x(t)|x(t_0))$, we are interested in computing the first two moments $\hat{x}(t)=(\hat{Q}(t),\hat{q}(t),\hat{v}(t),\hat{r}(t)) \triangleq \mathbb{E}[x(t)]$ and $\Sigma(t) \triangleq \mathbb{E}[\Delta_x(\hat{x}(t),x)\Delta_x^T(\hat{x}(t),x)]$ at each time t.

Naturally, we want the relative dynamics factor to be proportional to the distribution $p(x_{k+1}|x_k)$, as shown in the beginning of the Section 3.3. Noting that the time step between $t_k$ and $t_{k+1}$ is not known a-priori during the navigation segment, it is crucial to compute a process noise covariance $P_k=P(t_k)$, which appropriately scales with the time step length, using a discretization scheme. Such a treatment is similar to the prediction step of an Extended Kalman Filter with first-order approximation assumptions.

First, for the continuous case, we define the RelDyn factor residual $\epsilon^{RelDyn}$ such that:

$$\epsilon^{RelDyn}(x(t),x(t+dt)) \triangleq dx(t)-f(x(t),\hat{u}(t),p)dt.$$

Then, the factor $\phi^{RelDyn}$, as a function proportional to $\mathcal{N}(0, dP(t))$, where:

$$dP(t)= \mathbb{E}[(dx(t)-f(x(t),\bar{u}(t),p))(\cdot)^T],$$

may be simply defined as:

$$\phi^{RelDyn}(x(t),x(t+dt)) \triangleq \exp((\epsilon^{RelDyn}(x(t),x(t+dt)))^T dP^{-1}(t)\epsilon^{RelDyn}(*)).$$

Let the partition $\{t_k\}_{k=0}^N$ of the time interval $[t_0, t_f]$ be such that $t_0<t_1<\ldots<t_k<\ldots<t_N=t_f$. Given some $\hat{u}(t)$, $t\in[t_0, t_f]$, we generate the sequence of predictions $\{\hat{x}_k\}_{k=0}^N$ such that:

$$\Delta_X(\hat{x}_{k+1},\hat{x}_k) = \int_{t_k}^{t_{k+1}} \hat{f}(\hat{x}(\tau), \hat{u}(\tau), p)d\tau, \hat{x}(t_k) = \hat{x}_k, \quad (44)$$

is a valid discretization of the first-order approximation $\dot{\hat{x}}(t)\approx\hat{f}(\hat{x}(t),\hat{u}(t),p)$ for all $k=1,\ldots,N-1$, and such that:

$$P_k = \int_{t_k}^{t_{k+1}} L(\hat{x}(\tau), \hat{u}(\tau), p)L^T(\hat{x}(\tau), \hat{u}(\tau), p)dt, x(t_k)=x_k, \quad (45)$$

characterizes the discrete process noise over the time-span $[t_k, t_{k+1}]$. Then, using the definition in equation (36) and the equation (44), we define the RelDyn residual $\epsilon_k^{RelDyn}$ for the discrete case, as:

$$\epsilon_k^{RelDyn}(x_k, x_{k+1}) \triangleq \begin{bmatrix} \log((Q_k^T Q_{k+1})^T \Omega_k^{prop})^\vee \\ q_{k+1} - q_k - \int_{t_k}^{t_{k+1}} f_q(x(\tau), \hat{u}(\tau), p)d\tau \\ v_{k+1} - v_k - \int_{t_k}^{t_{k+1}} f_v(x(\tau), \hat{u}(\tau), p)d\tau \\ r_{k+1} - r_k - \int_{t_k}^{t_{k+1}} f_r(x(\tau), p)d\tau \end{bmatrix}, \quad (46)$$

where $x(t_k)=(Q_k, q_k, v_k, r_k)$ and where $\Omega_k^{prop}$ is defined such that, for a partition $$t_k = s_0 < s_1 < \ldots < s_n = t_{k+1},$$

$$\Omega_k^{prop} \triangleq \lim_{n\to\infty} \prod_{i=0}^{n-1} \exp\left(\int_{s_i}^{s_{i+1}} [f_Q(x(\tau), \hat{u}(\tau), p)]^\wedge d\tau\right),$$

$x(t_k)=x_k$, and is dubbed the McKean-Gangolli injection method, allowing for the stochastic process on the Lie group SO(3) to be written as a product integral. With appropriate correction factors, the limit can be truncated to numerically perform on-manifold integration with minimal error accumulation stemming from the approximation, as discussed in Section 4.6 below.

The factor $\phi_k^{RelDyn}$ for the discrete case may now be written as:

$$\phi_k^{RelDyn}(x_k,x_{k+1}) \triangleq ((\epsilon_k^{RelDyn}(x_k,x_{k+1}))^T P_k^{-1} \epsilon_k^{RelDyn}(x_k,x_{k+1})).$$

3.7. Smoothability of Chosen State Variables

It has been shown in that batch-style maximum a-posteriori solution to the factorization of a joint distribution over the variables to be estimated, which was discussed in Section 3, is equivalent to the solution obtained from optimal fixed-interval smoothing. Typically, the optimal smoothed state is defined as a linear combination of the state of the forward filter and the state of the backward filter at each time, with optimally chosen weights. A state is said to be smoothable if an optimal smoother provides a state estimate superior to that obtained when the final optimal filter estimate is extrapolated backwards in time. Furthermore, it has been shown that, given linear forward and backward filters, only those states which are controllable by the noise driving the system state vector are smoothable.

In this context, we evaluate the relevance of our choice of state variables and the noise input and derived stochastic equations of motion in Section 3.6 in terms of smoothability. However, since the concept of smoothability pertains to linear smoothing, direct application of the criterion to our problem is not possible. Instead, by demonstrating small-time local controllability through the noise by analysing a local linearization of the equations (31) to (33) at some $(\hat{x}_k,\hat{u}_k)$, we can assess the smoothability of our chosen state variables at that point.

Specifically, we can compute the local linearization matrices:

$$F_k \triangleq \frac{\partial f}{\partial x}\bigg|_{\substack{x=\hat{x}_k \\ u=\hat{u}_k \\ p=\hat{p}}} = \begin{bmatrix} \frac{\partial f_Q}{\partial \kappa} & 0 & 0 & 0 \\ \frac{\partial f_q}{\partial \kappa} & 0 & \frac{\partial f_q}{\partial v} & \frac{\partial f_q}{\partial r} \\ 0 & 0 & 0 & \frac{\partial f_v}{\partial r} \\ 0 & 0 & \frac{\partial f_r}{\partial v} & 0 \end{bmatrix}_{\substack{x=\hat{x}_k \\ u=\hat{u}_k \\ p=\hat{p}}}, \quad (47)$$

where $$\frac{\partial f_Q}{\partial \kappa} = [Q^\top w_0]^\wedge, [\kappa]^\wedge \in T_Q SO(3),$$

$$\frac{\partial f_q}{\partial \kappa} = -Q[R^\top v]^\wedge + [w_0]^\wedge Q[R^\top r]^\wedge$$

$$\frac{\partial f_q}{\partial v} = QR^\top, \frac{\partial f_q}{\partial r} = -[w_0]^\wedge QR^\top,$$

$$\frac{\partial f_r}{\partial v} = I_3, \frac{\partial f_v}{\partial r} = \frac{\mu_a}{\|r\|^5}(3rr^\top - \|r\|^2 I_3) - \frac{\mu_\odot}{\|d\|^3} I_3$$

and $L_k = L(\hat{x}_k, \hat{u}_k, p)$, where L is as defined in (43).

We now apply the PBH controllability test to show that our system does have small-time local smoothability at all points of interest in the state space X.

For simplifying purposes, since both $\hat{Q}$ and $\hat{R}$ are full rank, we assume $\hat{Q} = \hat{R} = I_3$ without loss of generality. Specifically, we see that the matrix $$\frac{\partial f_Q}{\partial \kappa} = [w_0]^\wedge$$

is skew-symmetric and is therefore of rank 2. It follows that $\lambda = 0$ is an eigenvalue of $F_k$. We compute the matrix $[F_k - \lambda I_3, L_k]$, which for $\lambda = 0$ takes the form $$[F_k, L_k] = \begin{bmatrix} [\hat{w}_0]^\wedge & 0 & 0 & 0 & I_3 & 0 \\ [\hat{v}]^\wedge + [\hat{w}]^\wedge [\hat{r}]^\wedge & 0 & I_3 & [\hat{w}]^\wedge & [\hat{v}]^\wedge - [\hat{w}]^\wedge [\hat{r}]^\wedge & 0 & 0 \\ 0 & 0 & 0 & I_3 & -[\hat{f}]^\wedge & 0 & I_3 \\ 0 & 0 & I_3 & 0 & 0 & 0 & 0 \end{bmatrix}.$$

We observe by inspection that, as long as $\hat{v}$ and $\hat{w}_0$ are not null at the same time, i.e., that the spacecraft 102 has some non-null relative velocity in the small celestial body fixed frame, then the PBH controllability matrix has rank 12, and thus the system is small-time locally controllable through the noise.

Therefore, it is crucial to include appropriate and physically justified noise terms in the considered dynamics to support smoothability. Furthermore, the inclusion of such noise avoids the degeneracy of the discrete process noise Gaussian distribution, with covariance $P_k$, as computed in Section 3.3. This argument supports the injection of noise through the input channel in the derivation of the stochastic equations of motion in Section 3.3.

4. Algorithm and Implementation Details

We are now ready to finally state the full solution to the problem and provide the key implementation details. Equations (44) and (45) constitute constraints on the evolution of the mean system state and its associated system noise covariance between time instances $t_k$ and $t_{k+1}$. We wish to enforce these constraints. Practically, at each time instance $t_k$, $k = 1 \ldots N$, we let $\tilde{x}_k$ be the current best guess of $\hat{x}_k$ and $\tilde{P}_k$ be the current best guess of $P_k$. Given $\tilde{x}_k$, $\tilde{x}_{k+1}$ and $\hat{u}(t)$, $t \in [t_k, t_{k+1}]$, we compute the residual due to equation (44), then the guess matrix $\tilde{P}_k$, and finally the value of the factor $\phi_k^{RelDyn}(\tilde{x}_k, \tilde{x}_{k+1})$. Note that the integrals in equations (46) and (45) are computed numerically using an on-manifold integration scheme, detailed later in this section. We note that the inclusion of the RelDyn factor introduces the spin state $w_0$ and the gravity parameter $\mu_a$ as variables into the factor graph.

As both the prior and projection factors are developed in detail in other works (see, for example), we simply restate them here using our notation, such that:

$$\phi^{prior}(x_0) \triangleq \exp(\Delta_\chi(\hat{x}_0, x_0)^\top \Sigma_0^{-1} \Delta_\chi(\hat{x}_0, x_0)),$$

$$\phi_*^{proj}(x_k, \ell_i) \triangleq \exp((y_{ik}^m - y_{ik})^\top (\Sigma_y^m)^{-1}(y_{ik}^m - y_{ik})),$$

where each $y_{ik}^m \in \mathcal{Y}_k$ is obtained as per the relationship in equation (6). We incorporate these prior factors on the initial state tuple. We finally incorporate the relative kinematics factors introducing the center-of-mass position parameter vector c.

Figure 4:
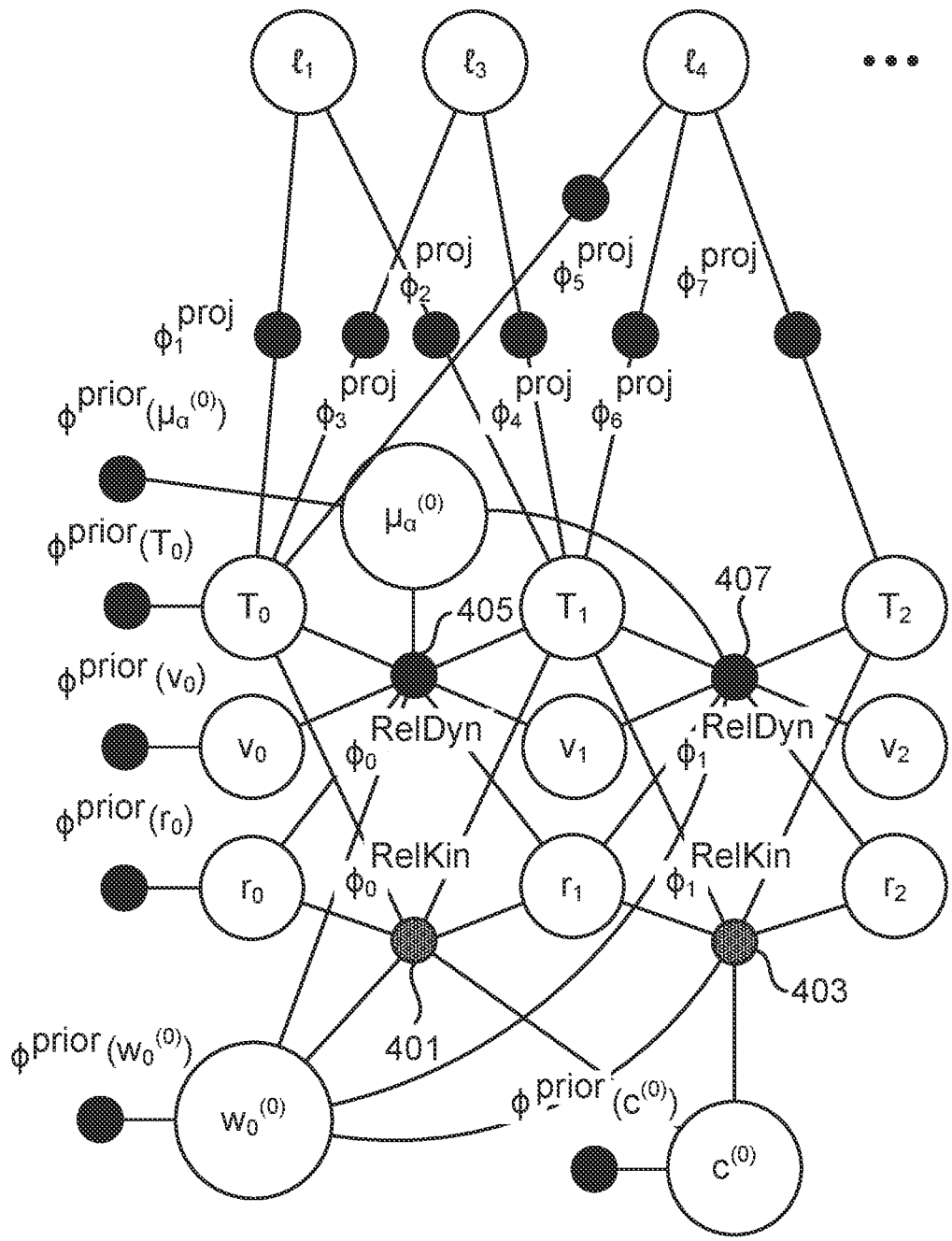
FIG. 4 is an illustration of a full AtsroSLAM factor graph.

The structure of the problem may now be organically schematized and analyzed as a factor graph. We have illustrated two initial steps of the AstroSLAM factor graph 400 in FIG. 4, where the RelKin factors and their related dependencies are illustrated by the nodes 401 and 403 and their edges, and the RelDyn factors and their related dependencies are illustrated by the nodes 405 and 407.

Next, we provide the implementation details of the algorithm, while underlining the specificities of the asteroid navigation problem. We first discuss the issue of complexity growth in the graph induced by the inclusion of global parameters. Then we discuss the state and map initialization steps of the algorithm, in which we insert prior factors for initial poses and kinematic variables of both the spacecraft and small celestial body, as well as generate an initial estimate for the map $\Psi_1$.

Finally, we discuss the overall architecture of Astro-SLAM. Our processing pipeline consists of a front-end system and a back-end system predicated on the iSAM2 engine and GTSAM library, along with an initialization step and a loop closure detection step.

5.1. Considerations Regarding Complexity Growth

Since we want to estimate the navigational states and simultaneously update the center of mass position c, the spin vector $w_0$, and the gravity parameter $\mu_a$ estimates on the fly, we have introduced these as variables in the factor graph, by means of the relative kinematic factor and RelDyn factor formulations. It is clear, however, that the inserted edges render the graph fully connected, since each state tuple $x_i$, $i = 1, \ldots, n$ is linked to the single parameter $\mu_a$ by means of the RelDyn factor $\phi_{i-1}^{RelDyn}$ and the factor $\phi_{i+1}^{RelDyn}$. Due to this, the clique sizes in the Bayes tree determined at each solution step of iSAM2 would get larger as the graph grows incrementally, and the updates in the Bayes tree would involve cliques that are ever more deep in the tree. If not addressed, this issue essentially forces iSAM2 to perform expensive batch optimization at every time-step, with the size of the batch update growing at every time-step. One intuitive workaround, is to solve for the variables related to the inertial factors in an incremental fashion at every step, but only sporadically optimize the kinematic rotation factors using a batch solve step, so to avoid the repeated and expensive batch optimization. However, we cannot implement such a method for our procedure, as our relative odometry RelDyn factor also depends on the global parameter $\mu_a$.

In our approach, we somewhat emulate the procedure of a fixed-lag smoother, by defining epochs $i = 1, \ldots, m$ to which we associate specific global variables $c^{(i)}$, $w_0^{(i)}$ and $\mu_a^{(i)}$. Over the epoch, the iSAM2 optimizer performs a batch update of the variable only related to that epoch at each timestep, by virtue of the fully connected property of the graph induced by the relative kinematic factor and the RelDyn factors. At every new epoch i, we marginalize the global parameter variables $c^{(i-1)}$, $w_0^{(i-1)}$, and $\mu_a^{(i-1)}$ from the previous epoch, and insert a new prior factor for each of the current global parameter variables $c^{(i)}$, $w_0^{(i)}$, and $\mu_a^{(i)}$. When inserting relative kinematic factors or RelDyn factors during epoch i, we associate these factors to their corresponding epoch's global parameter variables $c_i$ and $\mu_a^{(i)}$. A new epoch is induced at a fixed timestep interval (e.g., every 10 steps).

4.2. State Initialization

We leverage estimates from pre-encounter Earth-based measurements and approach phase sensor measurements to perform the initialization of both the spacecraft and small celestial body states. Inertial position measurements $r_{S_k 0}^{J,m}$ of the spacecraft 102, modelled as $r_{S_k 0}^{J,m} \triangleq r_{S_k 0}^{J} + v_r$, where $v_r \sim \mathcal{N}(0_{3\times 1}, \Sigma_r^m)$, are based on Earth-relative radiometric ranging and bearing measurements, a method of localization widely practiced in deep space mission spacecraft tracking using communication station networks, such as the DSN. Accurate ground-based navigation estimates using Earth-relative range and bearing measurements, such as uplink-downlink pulse ranging and Delta-Differenced One-Way Ranging (DDOR) are available to be used for initialization. It is important to note that our algorithm requires DSN-type measurements only during the initialization phase, to anchor the initial pose as described below.

Inertial position estimates of the small celestial body, denoted by $\hat{r}_{G_k 0}^{J}$, are predicated on orbit determination (OD) performed using Earth-based telescopic measurements. An initial relative position vector $\hat{r}_{S_0 G}$ estimate may be obtained by differencing spacecraft and small celestial body inertial position estimates. Alternatively, relative optical navigation (OpNAV) performed using pre-encounter sensor measurements, accurate in the order of several hundreds of meters for large small-bodies and tens of meters for small small-bodies, may be used to provide such an initial prior on the relative position.

To further simplify the initialization step, we assume that the small celestial body 101 is a stable single axis rotator. Thus, we align the arbitrary frame $\mathcal{G}$ such that $\omega_{\mathcal{G}_0 J} = w_0 \vec{g}_3$, where $w_0$ is the magnitude of the angular velocity vector of the small celestial body 101. The unit vector $\vec{g}_3^J$ is classically parameterized by the spin pole tilt angles relative to the J2000 ecliptic plane. If sufficient pre-encounter observations are available, a prior for these angles can be estimated and their associated uncertainty computed.

Typically, a prominent and salient feature on the surface is hand-picked as the prime meridian direction, thus fixing the $\vec{g}_1$ axis. In our case, given the initial prior $r_{S_0 G_0}^{J}$ discussed earlier, the prime meridian $\vec{g}_1$ may be initialized by first computing $\vec{g}_2$ following $\vec{g}_2^J = [\vec{g}_3^J]^\wedge r_{S_0 G_0}^{J} / \|r_{S_0 G_0}^{J}\|$, and then computing $\vec{g}_1^J = [\vec{g}_2^J]^\wedge \vec{g}_3^J$. Consequently, $R_{\mathcal{G}_0}^{J} = [\vec{g}_1^J \; \vec{g}_2^J \; \vec{g}_3^J]$ is determined. Note that, for this method to work, the spacecraft relative position at initialization time cannot be coincident with the small celestial body spin axis. In practice, an on-board star tracker system is leveraged to obtain an orientation measurement $R_{JS_k}^{m}$, modelled as $R_{JS_k}^{m} \triangleq R_{JS_k} \exp([v_R]^\wedge), v_R \sim \mathcal{N}(0_{3\times 1}, \Sigma_R^m)$. Orientation measurements are usually known with very good accuracy and little uncertainty.

We may now establish the prior factor for relative pose $T_{\mathcal{G}_0 S_0}$ by combining the information we have available at initialization. We first define the relative measurement at time k=0, using (4), Oven by $$T_{\mathcal{G}_0 S_0}^{m} = \begin{bmatrix} \hat{R}_{J\mathcal{G}_0}^{T} R_{JS_0}^{m} & \hat{R}_{J\mathcal{G}_0}^{T} r_{S_0 G_0}^{J,m} \\ 0_{1\times 3} & 1 \end{bmatrix} = \begin{bmatrix} \hat{R}_{J\mathcal{G}_0}^{T} R_{JS_0} \exp([v_R]^\wedge) & \hat{r}_{S_0 G_0}^{\mathcal{G}_0} + \hat{R}_{J\mathcal{G}_0}^{T} v_r \\ 0_{1\times 3} & 1 \end{bmatrix}$$
$$= \begin{bmatrix} \hat{R}_{J\mathcal{G}_0}^{T} R_{JS_0} & r_{S_0 G_0}^{\mathcal{G}_0} \\ 0_{1\times 3} & 1 \end{bmatrix} \begin{bmatrix} \exp([v_R]^\wedge) & R_{JS_0}^{T} v_r \\ 0_{1\times 3} & 1 \end{bmatrix},$$

where $r_{S_0 G}^{J,m}$ is the relative position vector at time k=0 obtained by differencing inertial position estimates of the spacecraft 102 and the small celestial body 101, or by means of an OpNav solution. It then follows that:

$$T_{\mathcal{G}_0 S_0}^{-1} T_{\mathcal{G}_0 S_0}^{m} = \begin{bmatrix} \exp([\varepsilon_1]^\wedge) & \varepsilon_2 \\ 0_{1\times 3} & 1 \end{bmatrix}, \tag{48}$$

where $\varepsilon_1 = v_R$ and $\varepsilon_2 = R_{JS_k}^{T} v_r$. Using the logarithm map of the SE(3) group of homogeneous transformations at the identity and the vee operator, as detailed in Section 1.1, we can write:

$$[\log(T_{\mathcal{G}_0 S_0}^{-1} T_{\mathcal{G}_0 S_0}^{m})]^\vee = \begin{bmatrix} \varepsilon_1 \\ \varepsilon_2 \end{bmatrix} \sim \left(0_{6\times 1}, \sum_{T,0}^{m}\right), \tag{49}$$

where, by first-order linear approximation, we have $\Sigma_{T,0}^{m} = J_R \Sigma_R^{m} J_R^{T} + J_r (\hat{R}_{J\mathcal{G}_0}^{T} R_{JS_0}^{m}) \Sigma_r^{m} J_r^{T} (\hat{R}_{J\mathcal{G}_0}^{T} R_{JS_0}^{m})$, computed using Fact 4 where $R \in SO(3)$. A prior factor $\phi_0^{prior}(T_{\mathcal{G}_0 S_0})$ is emplaced in the graph. This factor encodes the residual between the pose $T_{\mathcal{G}_0 S_0} \in SE(3)$ and the measurement $T_{JS_c}^{m}$, with covariance $\Sigma_{T,0}^{m}$.

4.3. Map Initialization

Initialization of the map is delayed until time index k=1, at which point at least two images of the target with sufficient parallax are captured. Local image features $\gamma_0$ and $\gamma_1$ are extracted and undergo data association, with outlier rejection, producing a set of 2D-2D correspondences. A strict outlier rejection criterion is used to obtain a subset of reliable correspondences. It is now possible to apply a typical 8-point algorithm using the inlier 2D-2D correspondences to find a guess pose transformation $\hat{T}^\circ \in SE(3)$ such that:

$$\hat{T}^\circ \triangleq \begin{bmatrix} \hat{R}^\circ & \hat{t}^\circ \\ 0 & 1 \end{bmatrix},$$

where $\hat{R}^\circ \in SO(3)$ and $\hat{t}^\circ \in \mathbb{R}^3$, describe the estimated change in relative orientation and relative position between the poses of the camera frame at time indices k=0 and k=1. From the frame kinematics and composition rules, and knowing that $\hat{R}^\circ = \hat{R}_{\mathcal{C}_0 \mathcal{C}_1}$, it follows that $\hat{R}_{\mathcal{G}_1 S_1} = \hat{R}_{\mathcal{G}_1 \mathcal{G}_0} \hat{R}_{\mathcal{G}_0 S_0} R_{SC} \hat{R}^\circ R_{CS}$. We note that $\hat{R}_{\mathcal{G}_0 \mathcal{G}_1} \approx \exp([-\hat{\omega}_{\mathcal{G}_0 J}^{J} \Delta t_0]^\wedge)$ It follows that $\hat{R}_{\mathcal{G}_1 S_1} \approx \exp(\hat{\omega}_{\mathcal{G}_0 J}^{J} \Delta t_0]^\wedge) \hat{R}_{\mathcal{G}_0} R_{JS_0}^{m} R_{SC} \hat{R}^\circ R_{CS}.$ Additionally, we know that:

$$t^\circ = \lambda r^{c_n}_{C_n C_n} = \lambda \hat{R}_{CS}(r^S_{C_n S} + R_{S_0 G_0} R_{G_0 G_1} r^{G_1}_{S_1 G} - (r^S_{C_n S} + R_{S_0 G_0} r^{G_0}_{S_0 G})) = \lambda R_{CS} \hat{R}_{S_0 G_0}(\exp([\hat{\omega}^{G_0}_{G_0, I} \Delta t_0]^\wedge) r^{G_1}_{S, G} - r^{G_0}_{S_0 G}), \quad (50)$$

with $\lambda > 0$, an unknown scaling factor.

Thus, in order to establish reliable relative pose estimates $\hat{T}_0$ and $\hat{T}_1$, a good prior knowledge of the small celestial body 101 inertial angular velocity is required. Additionally, the ambiguity in the scale parameter $\lambda$ still remains. Typically, scale can be established using off-nadir altimeter measurements over a range of orbital configurations in a multi-arc solution, as perform by the OSIRIS-REx mission around asteroid Bennu. However, the latter solution, in its current format, is not amenable to on-the-fly autonomy, as the batch estimation process requires a compilation of data from multiple mission arcs. Furthermore, altimeter measurements have to be used at close range to the target small celestial body 101, again restricting autonomy since judiciously pre-designed maneuvers have to be executed to first obtain the necessary altimeter measurements at close range. If a good initial estimate of the angular velocity $w_0$ of the small celestial body is available, the map scale can be determined by combining DSN-like inertial position measurements with the orientation matrix and position vectors extracted from the relative poses $T_0$ and $T_1$, as shown in Equation (50). The availability of such prior knowledge currently depends heavily on Earth-based and pre-encounter measurements of the target small celestial body 101. Regarding this matter, the ambiguity in scale due to the parameter $\lambda$ is determining in the estimation of an appropriate spherical gravity parameter term $\mu_a$. An error in $\mu_a$ will then affect the propagation step of the smoothing process. For the purpose of this work, we have assumed that the scale parameter $\lambda$ is well known.

Figure 5:
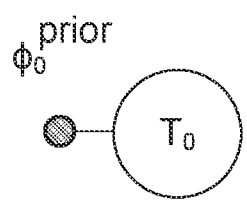
FIG. 5 is an illustration of step of the SLAM problem.
Figure 5:
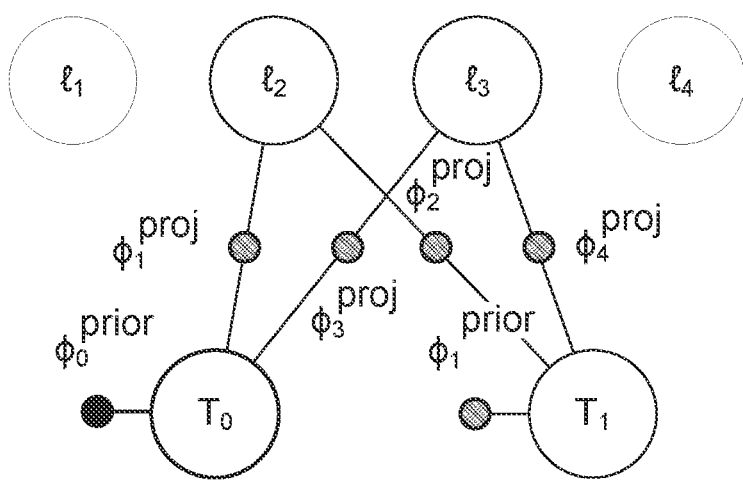

Having an estimate of poses $\hat{T}_0$ and $\hat{T}_1$, we compute the triangulation of the landmarks $\Psi_1$ using measurements $\gamma_0$ and $\gamma_1$. We then generate guess values for the estimated landmark positions $\{r^G_{LG}\}_{L \in \Psi_1}$. At this step, all appropriate factors are inserted based on the 2D-to-3D correspondences, resulting in the factor graphs 500 and 501 illustrated in FIG. 5, where the shorthands $\ell_i \triangleq r^G_{L_i G}$, $L_i \in \Psi_k$ and $T_k \triangleq T_{G_k S_k}$, k=0, ..., n are used for brevity.

4.4. Front-End

The front-end system includes feature detection and matching, and encodes the structure of a typical monocular bundle adjustment pipeline in a factor graph based on index mappings defined in Section 1.3.

At every new image acquisition, first, we store the corresponding wall clock time, as the difference between two consecutive image acquisition times is necessary for propagating the RelDyn factors inserted later in the factor graph. We then detect ORB features in the new image. ORB features perform well in practice and they are fast to compute. These are also good placeholders for more robust automatic features to be implemented in the future. We use brute force nearest neighbor search based on the Hamming distance for binary feature descriptors to perform feature matching against previous image frames (e.g., n−1, n−2) and populate an initial 2D-to-2D correspondence map. We also enforce an essential matrix constraint as a geometric check for matched features per a RANSAC procedure, thus eliminating outlier associations in the 2D-to-2D correspondence map. We append the corresponding matches to a list of feature tracks maintained since the beginning of the algorithm procedure.

All tracked feature points in the current frame n may be separated into three subsets: a set of sightings for new landmark points to be triangulated, a set of sightings of known landmark points to be tracked, and a set of outlier points to be rejected. The outlier set of feature points is discarded.

The first subset of the tracked features corresponds to measurements of surface point landmarks that have not been previously sighted and which need to be triangulated using all accumulated sightings in the feature track. Leveraging the latest guess pose $\tilde{T}_{G_n C_n}$, a guess value for the 3D position of the landmarks is generated using triangulation. We delay triangulation and insertion of new landmarks into the graph based on the number of sightings of the associated landmark. If that number is above a predetermined threshold, say 3, then we attempt triangulation of the point using all of the measurements in the sighting of that surface point. If the landmark point has been successfully triangulated using the feature point sightings that were used for the triangulation, appropriate 2D-to-3D correspondences capturing the new data association are accumulated. Projection factors between the new landmark variable and all camera poses where the landmark was sighted are added to the factor graph.

The second subset of tracked features corresponds to new sightings of surface point landmarks previously triangulated. This subset is populated by verifying if the currently tracked feature has an associated landmark already in the 2D-to-3D correspondences maps. The feature-landmark matched pairs undergo a reprojection error test, after which the surviving pairs establish new GTSAM projection factors inserted into the graph between known landmarks and relating to the most recent frame n. If there are enough tracked features from time index k=n−1, then visual tracking is successful and the PnP algorithm is used to guess the camera pose $\tilde{T}_{G_n C_n}$ value from matched correspondences. Alternatively, when RelDyn factors are included and if the PnP solution is of poor quality, we use the prediction from the motion model at time $t_n$ to guess a new camera pose $\tilde{T}_{G_n C_n}$.

Figure 6:
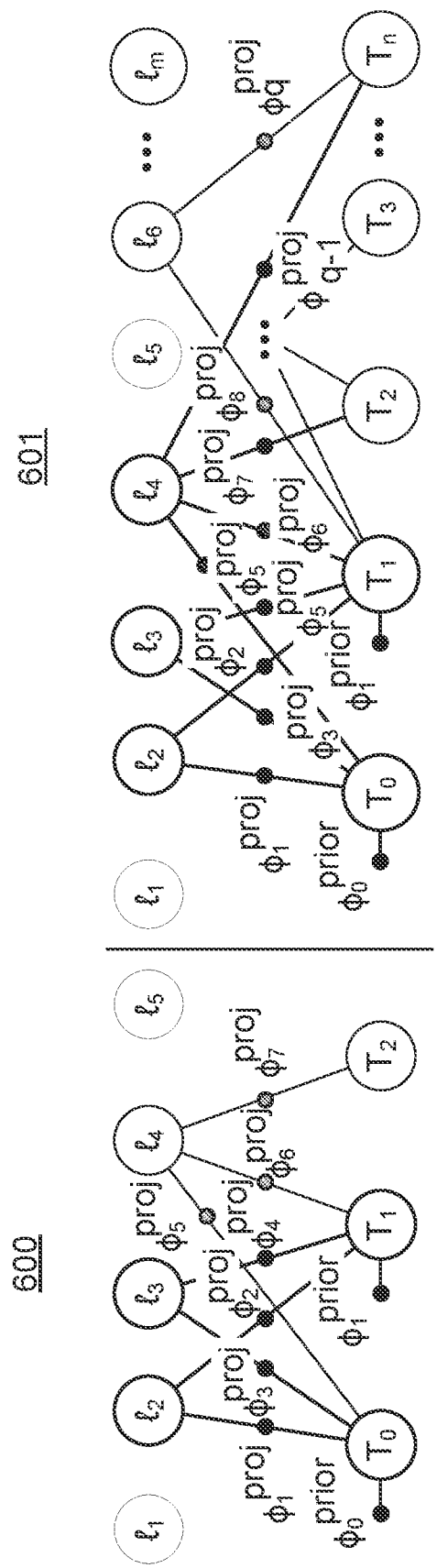
FIG. 6 is an illustration of a front-end pipeline factor graph following the initialization of the SLAM problem.

For every new frame inserted, the graph is incrementally augmented with the new variables and factors by the front-end, as is illustrated in the graphs 600 and 601 of FIG. 6.

4.5. Back-End

The underlying structure of the navigation problem is thus captured by encoding visual SLAM measurement constraints, relative kinematic constraints, Earth-relative inertial position measurement constraints as factors, and RelDyn factors in a single factor graph, as we explained in Section 3.1.

In practice, the optimization associated with the small celestial body relative navigation problem is performed incrementally in the factor graph framework using the iSAM2 algorithm. The back-end implements iSAM2 algorithm's procedure, which was discussed earlier in Section 3.1. iSAM2 evaluates the losses at each factor marked for update, computes the associated Jacobians at the guess values, and performs the minimization for inference, yielding a new estimate solution. Note that since the process noise covariance related to the RelDyn factor, as detailed in Section 3.6, is not fixed, but is rather the solution to a dynamical equation, the out-of-the-box GTSAM factor template had to be modified to allow for a variable process noise covariance to be incorporated accordingly. This procedure deviates from the pre-integrated IMU accelerometer factor, since our case, the integrated quantities are non-linear in terms of the state. Indeed, at each evaluation of the factor error, the discrete process noise covariance, also a non-linear function of the state, is propagated accordingly. This covariance is associated with a Gaussian process distribution, and once computed, we replace GTSAM's internal representation of the covariance of the factor error with new process noise covariance.

4.6. Computation of the RelDyn Factor Residual

We wish to compute numerically integrated quantities between successive states, so to evaluate the RelDyn factor error established in Section 3.3. To this end, we perform on-manifold discrete Crouch-Grossman geometric integration to obtain accurate predictions which also respect the constraints of the relative rotation matrix $Q(t) \in SO(3)$. Given $\{t_k\}_{k=0}^{N}$, for every k=0, ..., N−1, let $\Delta t_k \triangleq t_{k+1} - t_k$, we use an $N_s$-stage Crouch-Grossman geometric integration scheme and compute the propagated quantities:

$$\tilde{\Omega}_k^{prop} \triangleq \prod_{i=1}^{N_s} \exp\left(\left[b_i \Delta t_k \tilde{f}_Q^{(i)}\right]^\wedge\right), \quad (51)$$

$$\begin{bmatrix} \Delta \tilde{q}_k^{prop} \\ \Delta \tilde{v}_k^{prop} \\ \Delta \tilde{r}_k^{prop} \end{bmatrix} \triangleq \sum_{i=1}^{N_s} b_i \Delta t_k \begin{bmatrix} \tilde{f}_{q,k}^{(i)} \\ \tilde{f}_{v,k}^{(i)} \\ \tilde{f}_{r,k}^{(i)} \end{bmatrix}, \quad (52)$$

whereby the shorthands:

$$\tilde{f}_{*,k}^{(i)} \triangleq f*(\tilde{x}_k^{(i)}, u_k^{(i)}, p), \quad * = Q, q, v, r \quad (53)$$

$$\tilde{x}_k^{(i)} \triangleq \left(\tilde{Q}_k^{(i)}, \tilde{q}_k^{(i)}, \tilde{v}_k^{(i)}, \tilde{r}_k^{(i)}\right), \quad (54)$$

$$\hat{u}_k^{(i)} \triangleq \hat{u}(t_k + c_i \Delta t_k), \quad (55)$$

$$\tilde{Q}_k^{(i)} \triangleq \tilde{Q}_k \prod_{j=1}^{i-1} \exp\left(\left[a_{ij} \Delta t_k \tilde{f}_{Q,k}^{(j)}\right]^\wedge\right), \quad (56)$$

$$\begin{bmatrix} \tilde{q}_k^{(i)} \\ \tilde{v}_k^{(i)} \\ \tilde{r}_k^{(i)} \end{bmatrix} \triangleq \begin{bmatrix} \tilde{q}_k \\ \tilde{v}_k \\ \tilde{r}_k \end{bmatrix} + \sum_{j=1}^{i-1} a_{ij} \Delta t_k \begin{bmatrix} \tilde{f}_{q,k}^{(j)} \\ \tilde{f}_{v,k}^{(j)} \\ \tilde{f}_{r,k}^{(j)} \end{bmatrix} \quad (57)$$

are defined and computed for every i=1, ..., $N_s$. The coefficients $a_{ij}$, $b_i$, $c_i$, j<i=1, ..., $N_s$ are obtained from an appropriate Butcher table. The number of rows in the table represents the number of time stages, with the $\{c_i\}$ column representing the coefficients of steps in time $t_i = t_k + c_i \Delta t_k$ where are functions are to be evaluated, the number of columns is representing the number of half-steps, with $\{c_i\}$ representing the weight of each half-step, and the coefficients $\{a_{ij}\}$ representing the weight of the intermediary stage i when computing the half-step j.

The RelDyn residual $\epsilon_k^{RelDyn}(\hat{x}_k, \hat{x}_{k+1})$ is now computed such that:

$$\epsilon_k^{RelDyn}(\tilde{x}_k, \tilde{x}_{k+1}) \triangleq \begin{bmatrix} \log\left(\left(\tilde{Q}_k^T \tilde{Q}_{k+1}\right)^T \tilde{\Omega}_k^{prop}\right)^\vee \\ \tilde{q}_{k+1} - \tilde{q}_k - \Delta \tilde{q}_k^{prop} \\ \tilde{v}_{k+1} - \tilde{v}_k - \Delta \tilde{v}_k^{prop} \\ \tilde{r}_{k+1} - \tilde{r}_k - \Delta \tilde{r}_k^{prop} \end{bmatrix}. \quad (58)$$

4.7 Process Noise Propagation

To compute $P_k$ we introduce the matrix $\kappa_k$ such that, given any pair $(\hat{x}_k, \hat{u}_k)$.

$$\Delta_X(x(t_{k+1}), \hat{x}_k) =$$

$$\Phi(t_{k+1}, t_k) \Delta_X(x(t_k), \hat{x}_k) + \int_{t_k}^{t_{k+1}} \Phi(t_{k+1}, \tau) L(\hat{x}(\tau), p) d\varepsilon(\tau) =$$

$$\Phi(t_{k+1}, t_k) \Delta_X(x(t_k), \hat{x}_k) + \Lambda_k \varepsilon_k,$$

with initial conditions $\hat{x}(t_k) = \hat{x}_k$, and $\hat{u}(t_k) = \hat{u}_k$, and where $\varepsilon_k \sim \mathcal{N}(0, I_9)$ and $\dot{\Phi}(t, t_k) = F(\hat{x}(t), \hat{u}(t), p)\Phi(t, t_k)$, $\Phi(t_k, t_k) = I_9$. We see that $P_k = \Lambda_k \Lambda_k^T$. It follows that:

$$P_k = \int_{t_k}^{t_{k+1}} \Phi(t_{k+1}, \tau) L(\hat{x}(\tau), p) L^T(\hat{x}(\tau), p) \Phi^T(t_{k+1}, \tau) d\tau,$$

$$\hat{x}(t_k) = \hat{x}_k, \hat{u}(t_k) = \hat{u}_k.$$

We further approximate the linearized system by assuming that the matrices F, L shown in Section 4.7 are piecewise constant over the interval $[t_k, t_{k+1}]$, i.e., $F_k \triangleq F(\hat{x}(t_k), \hat{u}(t_k), p)$, $L_k \triangleq L(\hat{x}(t_k), \hat{u}(t_k), p)$. Then, we construct the following matrix:

$$\hat{C} = \begin{bmatrix} F_k & L_k L_k^T \\ 0_{12 \times 12} & F_k^T \end{bmatrix},$$

take the matrix exponential, yielding:

$$e^{\hat{C} \Delta t_k} = \begin{bmatrix} \Phi_k & \Gamma_k \\ 0_{12 \times 12} & \Phi_k^T \end{bmatrix},$$

and we extract from the right-hand side the desired submatrices, i.e., the discrete state transition matrix $\Phi_k = (t_{k+1}, t_k)$ of the piecewise-constant linearization, as well as the covariance of the discretized process noise $\Lambda_k \varepsilon_k$, given as $P_k = \Gamma_k \Phi_k^T$.

5.8 Loop Closure

To perform loop closure, we leverage a bag-of-words (BoW) representation. We convert each image i=1, ..., N to a bag-of-words vector $v_i$ and compute the similarity metric $$s(v_i, v_j) \triangleq 1 - \frac{1}{2} \left| \frac{v_i}{|v_i|} - \frac{v_j}{|v_j|} \right|. \quad (59)$$

We compare all prior images that are at least 10 frames away from the current frame. When the similarity score for two images is greater than a threshold we perform an additional geometric check and then add a factor between the poses corresponding to the detected loop.

Figure 7:
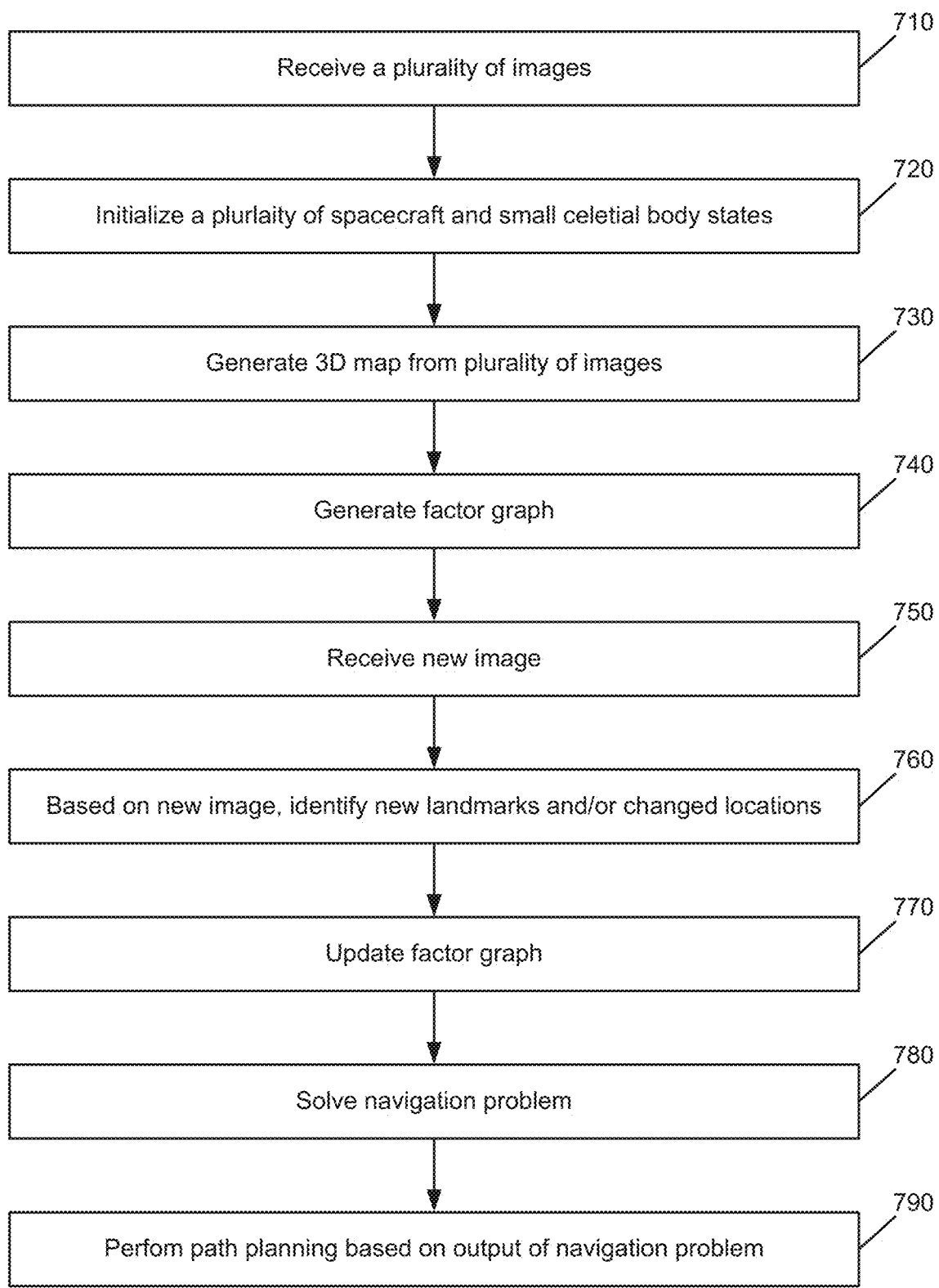
FIG. 7 is an illustration of an operational flow of an implementation of a method for performing path planning for a spacecraft in the presence of a small celestial body.

FIG. 7 is an illustration of an operational flow of an implementation of a method 700 for performing path planning for a spacecraft in the presence of a small celestial body. The method 700 may be implemented by the navigation engine 120 of the spacecraft 102.

At 710, a plurality of images are received. The plurality of images may be received by the navigation engine 120 of the spacecraft 102 from a sensor 110 such as a camera. Each image of the plurality of images may be associated with a time. Each image may be of a small celestial body 101 near the spacecraft 102. The small celestial body 101 may a comet or an asteroid.

At 720, a plurality of spacecraft and small celestial body states are initialized. The states may be initialized by a front-end component of the navigation engine 120. The states may be initialized using prior information known about the small celestial body 101 and/or the spacecraft 102.

At 730, a 3D map is generated from the plurality of images. The 3D map be generated by the front-end component of the navigation engine 120 from the plurality of images. The 3D map may be a 3D map of the small celestial body 101 and may be include a plurality of landmarks determined from the images of the plurality of images.

At 740, a factor graph is generated. The factor graph may be generated by a back-end component of the navigation engine 120. The may be generated based on the landmarks in the 3D map, the initialized states of the spacecraft 102, and one or more RelDyn factors that link the relative pose of the spacecraft 102 to the problem of predicting trajectories stemming from the motion of the spacecraft 102 in the vicinity of the small celestial body 101. Example factor graphs are shown in the graphs 500 and 501 of FIG. 5.

At 750, a new image is received. A new image may be received by the back-end component of the navigation engine 120. The new image may be received from the sensor 110 and may be an image that was not part of the plurality of images.

At 760, new landmarks or changed location are determined based on the new image. The new landmarks or changed location may be determined by the back-end component of the navigation engine 120.

At 770, the factor graph is updated. The factor graph may be updated by the back-end of the navigation engine 120 to reflect the new landmarks or changed locations in the new image.

At 780, the navigation problem is solved. The navigation problem may be solved by the back-end of the navigation engine 120 performing an optimization on the factor graph. The results of the optimization may include estimates of past relative positions of the positions of the small celestial body 101 and the spacecraft 102, past relative orientations of the small celestial body 101 and the spacecraft 102, and past relative velocities of the small celestial body 101 and the spacecraft 102.

At 790, path planning is performed based on the output of the navigation problem. The path planning may be performed by the navigation engine 120 for the spacecraft 102. The path planning may include control of the spacecraft 102 in the vicinity of the small celestial body 101.

Figure 8:
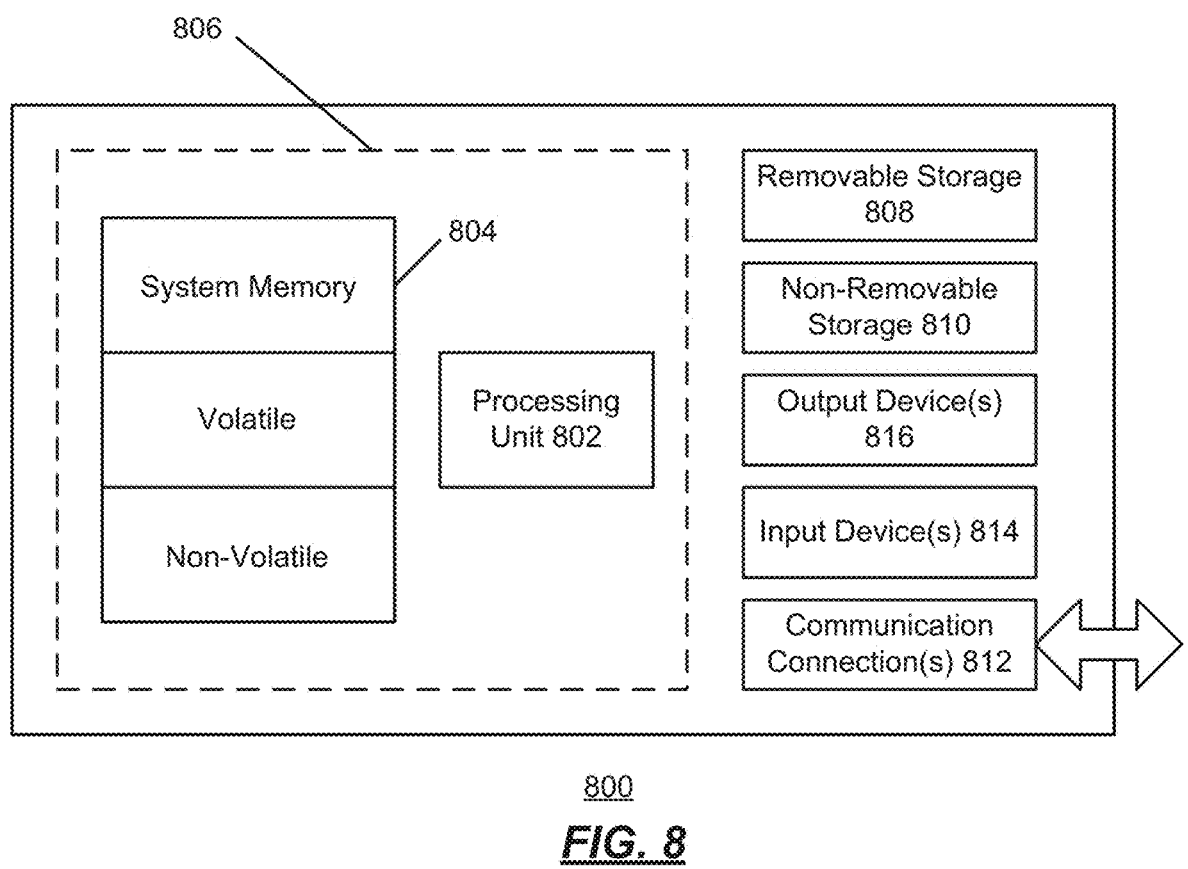
FIG. 8 shows an exemplary computing environment in which example embodiments and aspects may be implemented.

FIG. 8 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by the device 400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used.

Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications, and publications, as listed below and throughout this document, describes various application and systems that could be used in combination the exemplary system and are hereby incorporated by reference in their entirety herein.

What is claimed is:

1. A computer-implemented comprising:
receiving a plurality of images of a small celestial body by a spacecraft, wherein each image of the plurality of images is associated with a time;
initializing a plurality of spacecraft states and small celestial body states by the spacecraft;
based on the received plurality of images, generating a 3D map of the small celestial body including a plurality of landmarks by the spacecraft, wherein each landmark is associated with a location in the 3D map;
generating a factor graph corresponding to the plurality of landmarks and the plurality of spacecraft states and small celestial body states by the spacecraft;
receiving a new image by the spacecraft;
based on the new image and some or all of the plurality of images, identifying one or more new landmarks in the 3D map and a changed location for at least one of the plurality of landmarks by the spacecraft;
updating the factor graph based on the one or more new landmarks and the changed location by the spacecraft;
receiving relative dynamical constraints by the spacecraft, wherein the relative dynamical constraints include at least one RelDyn factor that links a relative pose of the spacecraft to predicted trajectories of the spacecraft stemming from a motion of the spacecraft in the vicinity of the small celestial body;
solving a navigation problem based on the factor graph and the relative dynamical constraints by the spacecraft to generate relative orientations of the spacecraft and the small celestial body, relative positions of the spacecraft and the small celestial body, and relative velocities of the relative positions of the spacecraft and the small celestial body;
performing path planning for the spacecraft by the spacecraft using some or all of the relative orientations of the spacecraft and the small celestial body, the relative positions of the spacecraft and the small celestial body, the relative velocities of the relative positions of the spacecraft and the small celestial body, and the 3D map; and
causing the spacecraft to travel based on the path planning by the spacecraft.

2. The computer-implemented method of claim 1, further comprising:
receiving visual odometry constraints and relative kinematic constraints; and
solving the navigation problem based on the factor graph and the received visual odometric constraints and the relative kinematic and dynamical constraints.

3. The computer-implemented of claim 1, further comprising receiving prior information about the small celestial object and initializing the plurality of small celestial body states based on the prior information.

4. The computer-implemented method of claim 3, wherein the prior information comprises a spin state estimate.

5. The computer-implemented method of claim 1, further comprising solving the navigation problem based on the factor graph by the spacecraft to generate an estimate of a center-of-mass position of the small celestial body.

6. The computer-implemented method of claim 1, wherein the small celestial body comprises an asteroid or a comet.

7. A spacecraft comprising:
at least one computing device; and
a computer-readable medium with computer-executable instructions stored thereon that when executed by the at least one computing device cause the at least one computing device to:
receive a plurality of images of a small celestial body, wherein each image of the plurality of images is associated with a time;
initialize a plurality of spacecraft states and small celestial body states;
based on the received plurality of images, generate a 3D map of the small celestial body including a plurality of landmarks, wherein each landmark is associated with a location in the 3D map;
generate a factor graph corresponding to the plurality of landmarks and the plurality of spacecraft states and small celestial body states;
receive a new image;
based on the new image and some or all of the plurality of images, identify one or more new landmarks in the 3D map and a changed location for at least one of the plurality of landmarks;
update the factor graph based on the one or more new landmarks and the changed location;
receive relative dynamical constraints by the spacecraft, wherein the relative dynamical constraints include at least one RelDyn factor that links a relative pose of the spacecraft to predicted trajectories of the spacecraft stemming from a motion of the spacecraft in the vicinity of the small celestial body;
solve a navigation problem based on the factor graph and the relative dynamical constraints to generate relative orientations of the spacecraft and the small celestial body, relative positions of the spacecraft and the small celestial body, and relative velocities of the relative positions of the spacecraft and the small celestial body;
perform path planning for the spacecraft using some or all of the relative orientations of the spacecraft and the small celestial body, the relative positions of the spacecraft and the small celestial body, the relative velocities of the relative positions of the spacecraft and the small celestial body, and the 3D map; and
cause the spacecraft to travel based on the path planning.

8. The spacecraft of claim 7, further comprising computer-executable instructions that when executed by the at least one computing device cause the at least one computing device to:
receive visual odometry constraints and relative kinematic constraints; and
solve the navigation problem based on the factor graph and the received visual odometric constraints and the relative kinematic and dynamical constraints.

9. The spacecraft of claim 7, further comprising receiving prior information about the small celestial object and initializing the plurality of small celestial body states based on the prior information.

10. The spacecraft of claim 9, wherein the prior information comprises a spin state estimate.

11. The spacecraft of claim 7, further comprising solving the navigation problem based on the factor graph by the spacecraft to generate an estimate of a center-of-mass position of the small celestial body.

12. The spacecraft of claim 7, wherein the small celestial body comprises an asteroid or a comet.

13. A non-transitory computer-readable medium with computer-executable instructions stored thereon that when executed by the at least one computing device cause the at least one computing device to:
- receive a plurality of images of a small celestial body, wherein each image of the plurality of images is associated with a time;
- initialize a plurality of spacecraft states of a spacecraft and small celestial body states;
- based on the received plurality of images, generate a 3D map of the small celestial body including a plurality of landmarks, wherein each landmark is associated with a location in the 3D map;
- generate a factor graph corresponding to the plurality of landmarks and the plurality of spacecraft states and small celestial body states;
- receive a new image;
- based on the new image and some or all of the plurality of images, identify one or more new landmarks in the 3D map and a changed location for at least one of the plurality of landmarks;
- update the factor graph based on the one or more new landmarks and the changed location;
- receive relative dynamical constraints by the spacecraft, wherein the relative dynamical constraints include at least one RelDyn factor that links a relative pose of the spacecraft to predicted trajectories of the spacecraft stemming from a motion of the spacecraft in the vicinity of the small celestial body;
- solve a navigation problem based on the factor graph and the relative dynamical constraints to generate relative orientations of the spacecraft and the small celestial body, relative positions of the spacecraft and the small celestial body, and relative velocities of the relative positions of the spacecraft and the small celestial body;
- perform path planning for the spacecraft using some or all of the relative orientations of the spacecraft and the small celestial body, the relative positions of the spacecraft and the small celestial body, the relative velocities of the relative positions of the spacecraft and the small celestial body, and the 3D map; and
- cause the spacecraft to travel based on the path planning.

14. The computer-readable medium of claim 13, further comprising computer-executable instructions that when executed by the at least one computing device cause the at least one computing device to:
- receive visual odometry constraints and relative kinematic constraints; and
- solve the navigation problem based on the factor graph and the received visual odometric constraints and the relative kinematic and dynamical constraints.

15. The computer-readable medium of claim 13, further comprising receiving prior information about the small celestial object and initializing the plurality of small celestial body states based on the prior information.

16. The computer-readable medium of claim 15, wherein the prior information comprises a spin state estimate.

17. The computer-readable medium of claim 13, further comprising solving the navigation problem based on the factor graph by the spacecraft to generate an estimate of a center-of-mass position of the small celestial body.

* * * * *